United States Patent
Miura et al.

(10) Patent No.: US 10,717,439 B2
(45) Date of Patent: Jul. 21, 2020

(54) TRAVELING CONTROL SYSTEM AND VEHICLE CONTROL METHOD

(71) Applicant: HONDA MOTOR CO., LTD., Tokyo (JP)

(72) Inventors: Hiroshi Miura, Wako (JP); Makoto Yuzawa, Wako (JP)

(73) Assignee: HONDA MOTOR CO., LTD, Tokyo (JP)

(*) Notice: Subject to any disclaimer, the term of this patent is extended or adjusted under 35 U.S.C. 154(b) by 53 days.

(21) Appl. No.: 16/118,764

(22) Filed: Aug. 31, 2018

(65) Prior Publication Data
US 2019/0084564 A1 Mar. 21, 2019

(30) Foreign Application Priority Data
Sep. 15, 2017 (JP) ................. 2017-178009

(51) Int. Cl.
B60W 30/12 (2020.01)
B60W 40/06 (2012.01)
(Continued)

(52) U.S. Cl.
CPC .......... B60W 30/12 (2013.01); B60W 40/06 (2013.01); G05D 1/0238 (2013.01);
(Continued)

(58) Field of Classification Search
CPC ...... B60W 10/04; B60W 10/20; B60W 30/12; B60W 40/06; B60W 2050/046; B60W 2420/52; B60W 2550/12; B60W 2550/14; G05D 1/0229; G05D 1/0238; G05D 1/0278; G06K 9/00798
(Continued)

(56) References Cited

U.S. PATENT DOCUMENTS

2010/0020170 A1* 1/2010 Higgins-Luthman ........................ G06K 9/00791 348/135
2015/0151725 A1* 6/2015 Clarke ................ B60W 40/072 701/28
(Continued)

FOREIGN PATENT DOCUMENTS

JP 2006-182258 7/2006
JP 2010-019759 A 1/2010

OTHER PUBLICATIONS

Japanese Office Action (w/ partial translation) issued for Japanese Patent Application No. 2017-178009 dated Jun. 3, 2019.

*Primary Examiner* — Atul Trivedi
(74) *Attorney, Agent, or Firm* — Thomas | Horstemeyer, LLP

(57) ABSTRACT

There is provided a traveling control system. The traveling control system includes a first acquisition unit configured to acquire peripheral information of a self-vehicle, a second acquisition unit configured to acquire predetermined road information, a specifying unit configured to specify, based on the peripheral information acquired by the first acquisition unit, a width of a road on which the self-vehicle travels, and a control unit configured to perform traveling control based on a smaller one of a width of a road indicated by the road information acquired by the second acquisition unit and the width of the road specified by the specifying unit.

8 Claims, 11 Drawing Sheets

(51) Int. Cl.
   *G05D 1/02* (2020.01)
   *G06K 9/00* (2006.01)
   *B60W 10/04* (2006.01)
   *B60W 10/20* (2006.01)
   *B60W 50/04* (2006.01)

(52) U.S. Cl.
   CPC ......... *G06K 9/00798* (2013.01); *B60W 10/04* (2013.01); *B60W 10/20* (2013.01); *B60W 2050/046* (2013.01); *B60W 2420/52* (2013.01); *B60W 2552/00* (2020.02); *B60W 2555/20* (2020.02); *G05D 1/0229* (2013.01); *G05D 1/0278* (2013.01)

(58) Field of Classification Search
   USPC .......................................................... 701/23
   See application file for complete search history.

(56) References Cited

U.S. PATENT DOCUMENTS

| | | | | |
|---|---|---|---|---|
| 2015/0234045 A1* | 8/2015 | Rosenblum | ............. | G06T 7/215 342/71 |
| 2015/0307095 A1* | 10/2015 | Aso | ....................... | B60W 30/12 701/1 |
| 2016/0132705 A1* | 5/2016 | Kovarik | ............. | G06K 7/10376 340/10.3 |
| 2016/0216130 A1* | 7/2016 | Abramson | ......... | G01C 21/3423 |
| 2016/0221575 A1* | 8/2016 | Posch | ................... | B60W 30/14 |
| 2016/0325753 A1* | 11/2016 | Stein | ........................ | G06K 9/46 |
| 2016/0357188 A1* | 12/2016 | Ansari | ............... | G06K 9/00805 |
| 2017/0068248 A1* | 3/2017 | Kobayashi | ........... | G05D 1/0246 |
| 2017/0151982 A1* | 6/2017 | Fujii | .................... | G06K 9/6267 |
| 2017/0227966 A1* | 8/2017 | Monzen | ................ | B60W 30/00 |
| 2017/0242095 A1* | 8/2017 | Schuh | .................. | G05D 1/0293 |
| 2017/0242443 A1* | 8/2017 | Schuh | ................. | G06K 9/00791 |
| 2017/0270798 A1* | 9/2017 | Ushiba | .................... | G08G 1/161 |
| 2017/0291603 A1* | 10/2017 | Nakamura | .......... | B60W 30/095 |
| 2017/0334452 A1* | 11/2017 | Abe | ...... | G05D 1/0088 |
| 2018/0088572 A1* | 3/2018 | Uchida | ............. | B60W 60/0053 |
| 2018/0329418 A1* | 11/2018 | Baalke | ............. | G08G 1/09623 |
| 2018/0345959 A1* | 12/2018 | Fujii | ................ | B60W 30/0956 |
| 2018/0345960 A1* | 12/2018 | Fujii | ................ | B60W 30/0956 |
| 2018/0350242 A1* | 12/2018 | Fujii | ............... | B60W 30/18163 |
| 2018/0364723 A1* | 12/2018 | Cullinane | ........... | G06K 9/00832 |
| 2019/0170522 A1* | 6/2019 | Matsunaga | ........ | G01C 21/3415 |
| 2019/0212738 A1* | 7/2019 | Umetani | ............... | B60Q 1/503 |
| 2019/0263391 A1* | 8/2019 | Matsunaga | ........... | B60W 30/02 |
| 2019/0272435 A1* | 9/2019 | Kundu | ............... | G06K 9/00798 |
| 2019/0283754 A1* | 9/2019 | Toda | ...................... | B60W 30/17 |
| 2019/0286130 A1* | 9/2019 | Tsuchiya | ........... | B60W 60/0015 |
| 2019/0286140 A1* | 9/2019 | Miura | .................. | G05D 1/0088 |
| 2019/0291726 A1* | 9/2019 | Shalev-Shwartz | .... | B60W 40/06 |
| 2019/0291728 A1* | 9/2019 | Shalev-Shwartz | ........................... | B60W 40/105 |
| 2019/0294167 A1* | 9/2019 | Kutila | ............... | B60W 30/0956 |
| 2019/0308623 A1* | 10/2019 | Sato | ................ | G06K 9/00798 |
| 2019/0389465 A1* | 12/2019 | Ogino | .................. | B60W 40/04 |
| 2020/0057453 A1* | 2/2020 | Laws | .................... | B60W 30/17 |
| 2020/0103903 A1* | 4/2020 | Kuwahara | ........... | G05D 1/0212 |

* cited by examiner

TRAVELING CONTROL SYSTEM AND VEHICLE CONTROL METHOD

BACKGROUND OF THE INVENTION

Field of the Invention

The present invention relates to a vehicle control technique and, more particularly, to a traveling control system and a vehicle control method.

Description of the Related Art

Conventionally, a vehicle capable of performing automated driving is provided with a plurality of detection means (sensors and the like), and control concerning automated driving is performed based on the detection results of these detection means.

An example of a target detected by the detection means is information of an environment around the vehicle, that includes information pertaining to the state of a road surface. Examples of the information pertaining to the state of the road surface are the width (boundary) of a lane, the position of a white line, the presence/absence of an obstacle or the like, and information indicating whether the road surface is wet.

Japanese Patent Laid-Open No. 2010-019759 describes a technique in which if it is difficult to detect a white line from map data of the number of lanes and the width of each lane, the position of a self-vehicle is matched with a lane from a center line link closest to the position of the self-vehicle.

A vehicle supporting automated driving detects the position of a white line or a lane on a road surface using a plurality of detection means, and controls to travel within this range. However, for example, in automated driving in a snow accumulation environment, it is impossible to detect the position of a white line or the width of a lane on a road surface due to snow, and it is thus difficult to recognize the lane appropriately.

SUMMARY OF THE INVENTION

The present invention makes it possible to control automated driving appropriately even if neither a white line nor a lane on a road surface can be detected due to snow accumulation or the like.

According to one aspect of the present invention, there is provided a traveling control system comprising: a first acquisition unit configured to acquire peripheral information of a self-vehicle; a second acquisition unit configured to acquire predetermined road information; a specifying unit configured to specify, based on the peripheral information acquired by the first acquisition unit, a width of a road on which the self-vehicle travels; and a control unit configured to perform traveling control based on a smaller one of a width of a road indicated by the road information acquired by the second acquisition unit and the width of the road specified by the specifying unit.

According to another aspect of the present invention, there is provided a traveling control system comprising: a first acquisition unit configured to acquire peripheral information of a self-vehicle; a second acquisition unit configured to acquire predetermined road information; a specifying unit configured to specify, based on the peripheral information acquired by the first acquisition unit, a width of a road on which the self-vehicle travels; and a control unit configured to switch traveling control of the self-vehicle if a difference between a width of a road indicated by the road information acquired by the second acquisition unit and the width of the road specified by the specifying unit is not smaller than a predetermined threshold.

According to still another aspect of the present invention, there is provided a vehicle control method comprising: acquiring peripheral information of a self-vehicle; acquiring predetermined road information; specifying, based on the peripheral information acquired in the acquiring the peripheral information, a width of a road on which the self-vehicle travels; and performing traveling control based on a smaller one of a width of a road indicated by the road information acquired in the acquiring the predetermined road information and the width of the road specified in the specifying.

According to still another aspect of the present invention, there is provided a vehicle control method comprising: acquiring peripheral information of a self-vehicle; acquiring predetermined road information; specifying, based on the peripheral information acquired in the acquiring the peripheral information, a width of a road on which the self-vehicle travels; and switching traveling control of the self-vehicle if a difference between a width of a road indicated by the road information acquired in the acquiring the predetermined road information and the width of the road specified in the specifying is not smaller than a predetermined threshold.

According to the present invention, even if neither a white line nor a lane on a road surface can be detected due to snow accumulation or the like, it is possible to control automated driving appropriately.

Further features of the present invention will become apparent from the following description of exemplary embodiments (with reference to the attached drawings).

DESCRIPTION OF THE EMBODIMENTS

An embodiment of the present invention will be described below with reference to the accompanying drawings. Note that an arrangement and the like to be described below are merely examples, and the present invention is not limited to them.

An example of the arrangement of a vehicle control system concerning automated driving to which the present invention is applicable will be described.

Figure 1:
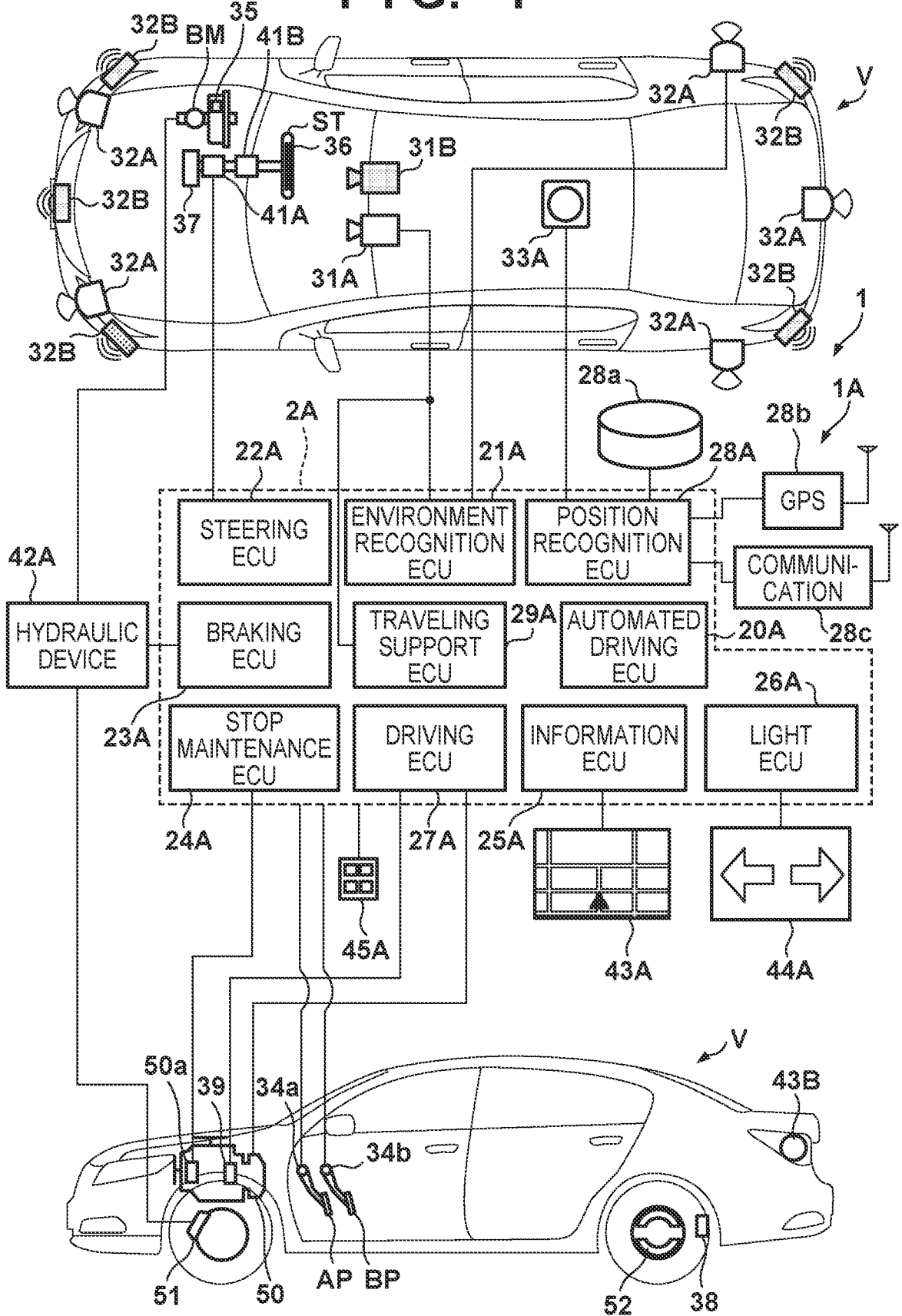
FIG. 1 is a block diagram showing a vehicle control system according to an embodiment of the present invention.
Figure 2:
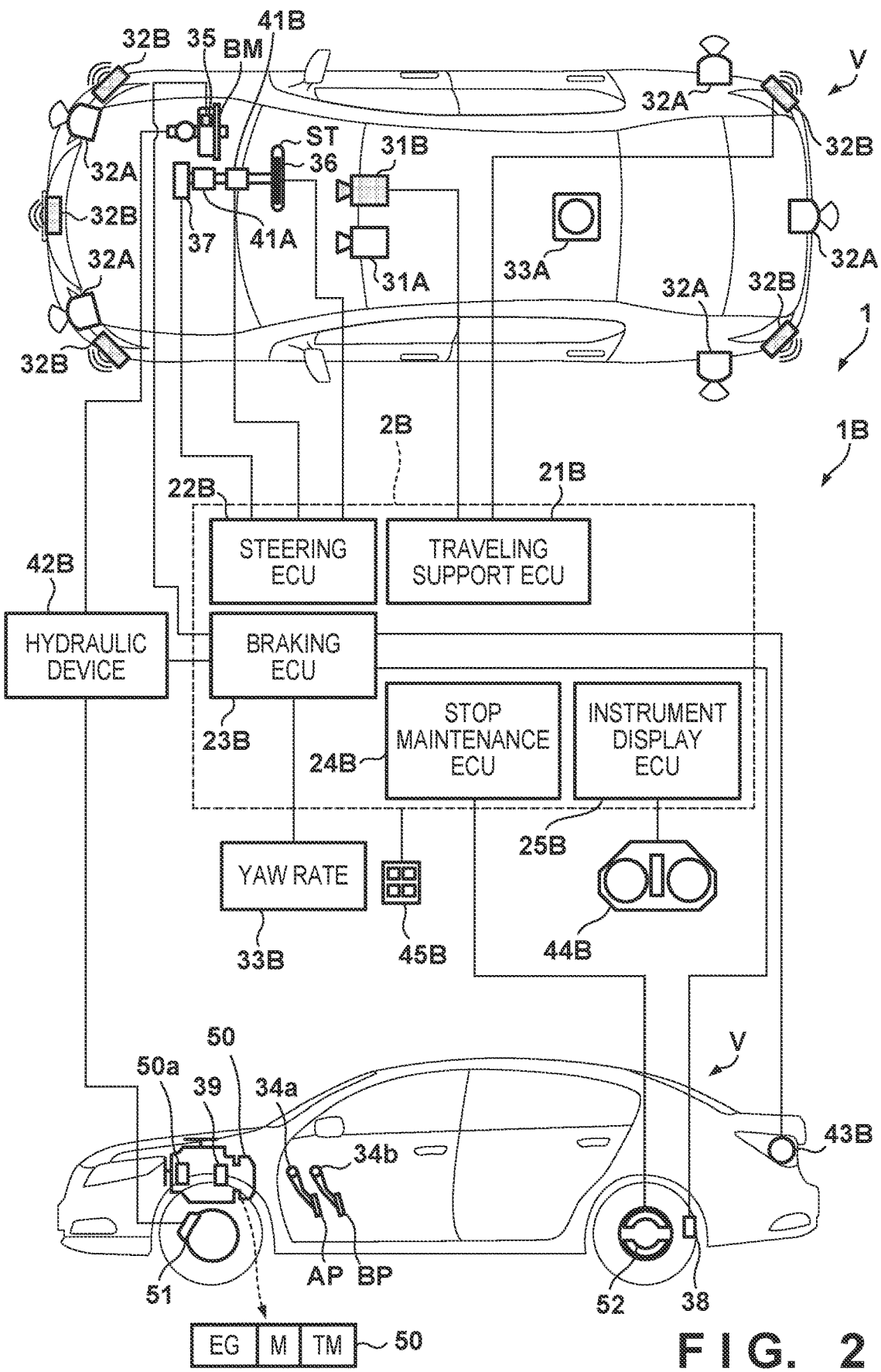
FIG. 2 is a block diagram showing the vehicle control system according to the embodiment of the present invention.
Figure 3:
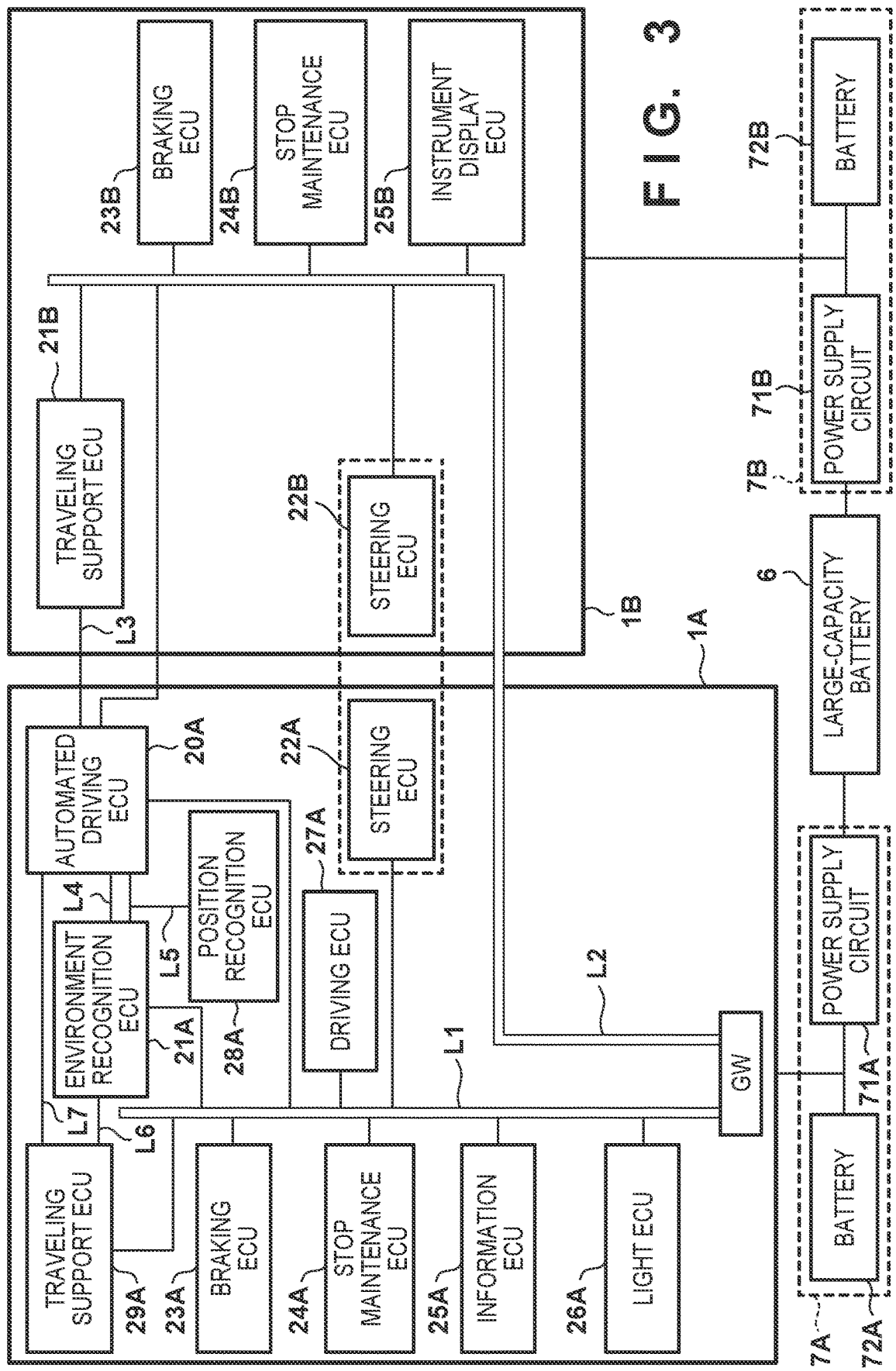
FIG. 3 is a block diagram showing the vehicle control system according to the embodiment of the present invention.

FIGS. 1 to 3 are block diagrams each showing a vehicle control system 1 according to the embodiment of the present invention. The control system 1 controls a vehicle V. Referring to FIGS. 1 and 2, plan views and side views show an outline of the vehicle V. As an example, the vehicle V is a sedan-type four-wheeled vehicle. The control system 1 includes control apparatuses 1A and 1B. FIG. 1 is a block diagram showing the control apparatus 1A, and FIG. 2 is a block diagram showing the control apparatus 1B. FIG. 3 mainly shows the arrangement of power supplies and communication lines between the control apparatuses 1A and 1B.

The control apparatuses 1A and 1B multiplex some of functions implemented by the vehicle V or make some of the functions redundant. This can improve the reliability of the system. The control apparatus 1A performs, for example, traveling support control concerning risk aversion or the like in addition to automated driving control and normal operation control in manual driving. The control apparatus 1B mainly manages traveling support control concerning risk aversion or the like. Traveling support will be sometimes referred to as driving support hereinafter. By making functions redundant in the control apparatuses 1A and 1B and causing them to perform different control processes, it is possible to distribute control processing and improve the reliability.

The vehicle V according to this embodiment is a parallel hybrid vehicle. FIG. 2 schematically shows the arrangement of a power plant 50 that outputs a driving force to rotate the driving wheels of the vehicle V. The power plant 50 includes an internal combustion engine EG, a motor M, and an automatic transmission TM. The motor M can be used as a driving source that accelerates the vehicle V and also used as an electric generator at the time of deceleration or the like (regenerative braking).

<Control Apparatus 1A>

The arrangement of the control apparatus 1A will be described with reference to FIG. 1. The control apparatus 1A includes an ECU group (control unit group) 2A. The ECU group 2A includes a plurality of ECUs 20A to 29A. Each ECU includes a processor represented by a CPU (Central Processing Unit), a storage device such as a semiconductor memory, and an interface with an external device. The storage device stores a program to be executed by the processor, data to be used by the processor for processing, and the like. Each ECU may include a plurality of processors, a plurality of storage devices, and a plurality of interfaces. Note that the number of ECUs and functions provided by the ECUs can be designed appropriately, and the ECUs can be subdivided or integrated, as compared to this embodiment. Note that FIGS. 1 and 3 show the names of the representative functions of the ECUs 20A to 29A. For example, the ECU 20A is represented as an "automated driving ECU".

The ECU 20A executes control concerning automated driving as traveling control of the vehicle V. In automated driving, at least one of driving (acceleration of the vehicle V by the power plant 50 or the like), steering, and braking of the vehicle V is automatically performed regardless of a driving operation of a driver. In this embodiment, driving, steering, and braking are automatically performed.

The ECU 21A serves as an environment recognition unit that recognizes the traveling environment of the vehicle V based on the detection results of detection units 31A and 32A for detecting the peripheral status of the vehicle V. The ECU 21A generates target data (to be described later) as peripheral environment information.

In this embodiment, the detection unit 31A serves as an image capturing device (to be sometimes referred to as the camera 31A hereinafter) that detects an object around the vehicle V by image capturing. The camera 31A is provided on the roof front of the vehicle V so as to capture the front side of the vehicle V. When images captured by the cameras 31A are analyzed, the contour of a target or a division line (a white line or the like) of a lane on a road can be extracted.

In this embodiment, the detection unit 32A serves as a LIDAR (Light Detection and Ranging) (to be sometimes referred to as the LIDAR 32A hereinafter) that detects an object around the vehicle V using light, and detects a target around the vehicle V and measures a distance to the target. In this embodiment, five LIDARs 32A are provided; one at each corner of the front portion of the vehicle V, one at the center of the rear portion, and one on each side of the rear portion. The number of LIDARs 32A and their arrangement can be selected appropriately.

The ECU 29A serves as a traveling support unit that executes control concerning traveling support (in other words, driving support) as traveling control of the vehicle V based on the detection result of the detection unit 31A.

The ECU 22A serves as a steering control unit that controls an electric power steering device 41A. The electric power steering device 41A includes a mechanism that steers front wheels in accordance with a driving operation (steering operation) of the driver on a steering wheel ST. The electric power steering device 41A includes a motor that generates a driving force to assist the steering operation or automatically steer the front wheels, a sensor that detects the rotation amount of a motor, and a torque sensor that detects a steering torque applied to the driver.

The ECU 23A serves as a braking control unit that controls a hydraulic device 42A. A braking operation of the driver on a brake pedal BP is converted into a hydraulic pressure in a brake master cylinder BM, and transferred to the hydraulic device 42A. The hydraulic device 42A is an actuator that can control, based on the hydraulic pressure transferred from the brake master cylinder BM, the hydraulic pressure of hydraulic oil to be supplied to a brake device (for example, a disc brake device) 51 provided in each of the four wheels, and the ECU 23A controls driving of a solenoid valve or the like provided in the hydraulic device 42A. In this embodiment, the ECU 23A and the hydraulic device 42A form an electric servo brake, and the ECU 23A controls distribution of, for example, braking forces generated by the four brake devices 51 and a braking force generated by regenerative braking of the motor M.

The ECU 24A serves as a stop maintenance control unit that controls an electric parking lock device 50a provided in the automatic transmission TM. The electric parking lock device 50a mainly includes a mechanism that locks the internal mechanism of the automatic transmission TM at the time of selection of a P range (parking range). The ECU 24A can control locking and unlocking by the electric parking lock device 50a.

The ECU 25A serves as an in-vehicle notification control unit that controls an information output device 43A for making a notification of information inside the vehicle. The information output device 43A includes, for example, a voice output device and a display device such as a head-up display. The information output device 43A may further include a vibration device. The ECU 25A causes the information output device 43A to output, for example, various kinds of information such as a vehicle seed and an outside air temperature and information such as route guidance.

The ECU 26A serves as an outside-vehicle notification control unit that controls an information output device 44A for making a notification of information outside the vehicle. In this embodiment, the information output device 44A is a direction indicator (hazard lamp), and the ECU 26A can make a notification of the traveling direction of the vehicle V outside the vehicle by controlling flickering of the information output device 44A as a direction indicator, and enhance the attentiveness to the vehicle V outside the vehicle by controlling flickering of the information output device 44A as a hazard lamp.

The ECU 27A serves as a driving control unit that controls the power plant 50. In this embodiment, one ECU 27A is assigned to the power plant 50 but one ECU may be assigned to each of the internal combustion engine EG, the motor M, and the automatic transmission TM. The ECU 27A controls the outputs of the internal combustion engine EG and motor M and switches the gear range of the automatic transmission TM in accordance with a driving operation of the driver, the vehicle speed, and the like detected by an operation detection sensor 34a provided in an accelerator pedal AP and an operation detection sensor 34b provided in the brake pedal BP. Note that a rotation speed sensor 39 that detects the rotation speed of the output shaft of the automatic transmission TM is provided, in the automatic transmission TM, as a sensor that detects the traveling state of the vehicle V. The vehicle speed of the vehicle V can be calculated based on the detection result of the rotation speed sensor 39.

The ECU 28A serves as a position recognition unit that recognizes the current position and course of the vehicle V. The ECU 28A controls a gyro sensor 33A, a GPS sensor 28b, and a communication device 28c, and performs information processing of a detection result or a communication result. The gyro sensor 33A detects a rotary motion of the vehicle V. The course of the vehicle V can be determined based on the detection result of the gyro sensor 33A and the like. The GPS sensor 28b detects the current position of the vehicle V. The communication device 28c performs wireless communication with a server that provides map information or traffic information and acquires these pieces of information. A database 28a can store high-precision map information, and the ECU 28A can specify the position of the vehicle V on the lane more precisely based on the map information and the like.

An input device 45A is arranged in the vehicle so as to be operable by the driver, and accepts input of an instruction or information from the driver.

<Control Apparatus 1B>

The arrangement of the control apparatus 1B will be described with reference to FIG. 2. The control apparatus 1B includes an ECU group (control unit group) 2B. The ECU group 2B includes a plurality of ECUs 21B to 25B. Each ECU includes a processor represented by a CPU, a storage device such as a semiconductor memory, and an interface with an external device. The storage device stores a program to be executed by the processor, data to be used by the processor for processing, and the like. Each ECU may include a plurality of processors, a plurality of storage devices, and a plurality of interfaces. Note that the number of ECUs and functions provided by the ECUs can be designed appropriately, and the ECUs can be subdivided or integrated, as compared to this embodiment. Note that FIGS. 2 and 3 show the names of the representative functions of the ECUs 21B to 25B, similarly to the ECU group 2A.

The ECU 21B serves as an environment recognition unit that recognizes the traveling environment of the vehicle V based on the detection results of detection units 31B and 32B for detecting the peripheral status of the vehicle V, and also serves as a traveling support unit that executes control concerning traveling support (in other words, driving support) as traveling control of the vehicle V. The ECU 21B generates target data (to be described later) as peripheral environment information.

Note that in this embodiment, the ECU 21B is configured to have the environment recognition function and the traveling support function. However, an ECU may be provided for each function, like the ECUs 21A and 29A of the control apparatus 1A. To the contrary, the control apparatus 1A may have an arrangement in which the functions of the ECUs 21A and 29A are implemented by one ECU, like the ECU 21B.

In this embodiment, the detection unit 31B serves as an image capturing device (to be sometimes referred to as the camera 31B hereinafter) that detects an object around the vehicle V by image capturing. The camera 31B is provided on the roof front of the vehicle V so as to capture the front side of the vehicle V. When images captured by the cameras 31B are analyzed, the contour of a target or a division line (a white line or the like) of a lane on a road can be extracted. In this embodiment, the detection unit 32B serves as a millimeter wave radar (to be sometimes referred to as the radar 32B hereinafter) that detects an object around the vehicle V using a radio wave, and detects a target around the vehicle V or measures a distance to a target. In this embodiment, five radars 32B are provided; one at the center of the front portion of the vehicle V, one at each corner of the front portion, and one at each corner of the rear portion. The number of radars 32B and their arrangement can be selected appropriately.

The ECU 22B is a steering control unit that controls an electric power steering device 41B. The electric power steering device 41B includes a mechanism that steers the front wheels in accordance with a driving operation (steering operation) of the driver on the steering wheel ST. The electric power steering device 41B includes a motor that generates a driving force to assist the steering operation or automatically steer the front wheels, a sensor that detects the rotation amount of a motor, and a torque sensor that detects a steering torque applied to the driver. A steering angle sensor 37 is electrically connected to the ECU 22B via a communication line L2 (to be described later), and it is possible to control the electric power steering device 41B based on the detection result of the steering angle sensor 37. The ECU 22B can acquire the detection result of a sensor 36 that detects whether the driver grips the steering wheel ST, and can monitor the gripping state of the driver.

The ECU 23B serves as a braking control unit that controls a hydraulic device 42B. A braking operation of the driver on the brake pedal BP is converted into a hydraulic pressure in the brake master cylinder BM, and transferred to the hydraulic device 42B. The hydraulic device 42B is an actuator that can control, based on the hydraulic pressure transferred from the brake master cylinder BM, the hydraulic pressure of hydraulic oil to be supplied to the brake device 51 of each wheel, and the ECU 23B controls driving of a solenoid valve or the like provided in the hydraulic device 42B.

In this embodiment, wheel speed sensors 38 respectively provided in the four wheels, a yaw rate sensor 33B, and a pressure sensor 35 that detects a pressure in the brake master cylinder BM are electrically connected to the ECU 23B and the hydraulic device 42B, thereby implementing, based on the detection results of these sensors, an ABS function, traction control, and a function of controlling the orientation of the vehicle V. For example, the ECU 23B adjusts the braking force of each wheel based on the detection result of the wheel speed sensor 38 provided in each of the four wheels, thereby suppressing sliding of each wheel. In addition, the braking force of each wheel is adjusted based on the rotation angular velocity around the vertical axis of the vehicle V, that has been detected by the yaw rate sensor 33B, thereby suppressing an abrupt change in orientation of the vehicle V.

The ECU 23B also functions as an outside-vehicle notification control unit that controls an information output device 43B for making a notification of information outside the vehicle. In this embodiment, the information output device 43B serves as a brake lamp, and the ECU 23B can turn on the brake lamp at the time of braking or the like. This can enhance the attentiveness of a following vehicle to the vehicle V.

The ECU 24B serves as a stop maintenance control unit that controls an electric parking brake device (for example, a drum brake) 52 provided in a rear wheel. The electric parking brake device 52 includes a mechanism that locks the rear wheel. The ECU 24B can control locking and unlocking of the rear wheel by the electric parking brake device 52.

The ECU 25B serves as an in-vehicle notification control unit that controls an information output device 44B for making a notification of information inside the vehicle. In this embodiment, the information output device 44B includes a display device arranged in an instrument panel. The ECU 25B can cause the information output device 44B to output various kinds of information such as a vehicle seed and fuel consumption.

An input device 45B is arranged in the vehicle so as to be operable by the driver, and accepts input of an instruction or information from the driver.

<Communication Line>

Examples of communication lines of the control system 1, that communicably connect the ECUs, will be described with reference to FIG. 3. The vehicle control system 1 includes wired communication lines L1 to L7. The ECUs 20A to 27A and 29A of the control apparatus 1A are connected to the communication line L1. Note that the ECU 28A may also be connected to the communication line L1.

The ECUs 21B to 25B of the control apparatus 1B are connected to the communication line L2. The ECU 20A of the control apparatus 1A is also connected to the communication line L2. The communication line L3 connects the ECUs 20A and 21A. The communication line L5 connects the ECUs 20A, 21A, and 28A. The communication line L6 connects the ECUs 29A and 21A. The communication line L7 connects the ECUs 29A and 20A.

The communication lines L1 to L7 may use the same protocol or different protocols, and may use different protocols in accordance with a communication environment such as a communication speed, communication amount, or durability. For example, the communication lines L3 and L4 may use Ethernet® in terms of the communication speed. For example, the communication lines L1, L2 and L5 to L7 may use CAN.

The control apparatus 1A includes a gateway GW. The gateway GW relays the communication lines L1 and L2. Therefore, for example, the ECU 21B can output a control command to the ECU 27A via the communication line L2, the gateway GW, and the communication line L1.

<Power Supply>

The power supply of the control system 1 will be described with reference to FIG. 3. The control system 1 includes a large-capacity battery 6 and power supplies 7A and 7B. The large-capacity battery 6 is a battery that is used to drive the motor M and is charged by the motor M.

The power supply 7A is a power supply that supplies power to the control apparatus 1A, and includes a power supply circuit 71A and a battery 72A. The power supply circuit 71A is a circuit that supplies power of the large-capacity battery 6 to the control apparatus 1A, and lowers, for example, the output voltage (for example, 190 V) of the large-capacity battery 6 to a reference voltage (for example, 12 V). The battery 72A is, for example, a 12-V lead battery. By providing the battery 72A, it is possible to supply power to the control apparatus 1A even if power supply of the large-capacity battery 6 or the power supply circuit 71A is interrupted or decreases.

The power supply 7B is a power supply that supplies power to the control apparatus 1B, and includes a power supply circuit 71B and a battery 72B. The power supply circuit 71B is a circuit similar to the power supply circuit 71A, and a circuit that supplies power of the large-capacity battery 6 to the control apparatus 1B. The battery 72B is a battery similar to the battery 72A, and is, for example, a 12-V lead battery. By providing the battery 72B, it is possible to supply power to the control apparatus 1B even if power supply of the large-capacity battery 6 or the power supply circuit 71B is interrupted or decreases.

<Redundancy>

The common functions of the control apparatuses 1A and 1B will be described. It is possible to improve the reliability of the control system 1 by making the same functions redundant. With respect to some of the functions made redundant, not completely the same functions are multiplexed and different functions are exhibited. This suppresses an increase in cost due to redundancy of the functions.

[Actuator System]

Steering

The control apparatus 1A includes the electric power steering device 41A and the ECU 22A that controls the electric power steering device 41A. The control apparatus 1B includes the electric power steering device 41B and the ECU 22B that controls the electric power steering device 41B.

Braking

The control apparatus 1A includes the hydraulic device 42A and the ECU 23A that controls the hydraulic device 42A. The control apparatus 1B includes the hydraulic device 42B and the ECU 23B that controls the hydraulic device 42B. Each of these apparatuses can be used for braking of the vehicle V. On the other hand, the braking mechanism of the control apparatus 1A has the main function of distributing the braking forces generated by the brake devices 51 and the braking force generated by regenerative braking of the motor M while the braking mechanism of the control apparatus 1B has the main function of controlling the orientation. These apparatuses commonly perform braking but exhibit different functions.

Stop Maintenance

The control apparatus 1A includes the electric parking lock device 50a and the ECU 24A that controls the electric parking lock device 50a. The control apparatus 1B includes the electric parking brake device 52 and the ECU 24B that controls the electric parking brake device 52. Each of these apparatuses can be used to maintain the stop of the vehicle V. On the other hand, the electric parking lock device 50*a* is a device that functions at the time of selection of the P range of the automatic transmission TM while the electric parking brake device 52 locks the rear wheel. These apparatuses commonly maintain the stop of the vehicle V but exhibit different functions.

In-Vehicle Notification

The control apparatus 1A includes the information output device 43A and the ECU 25A that controls the information output device 43A. The control apparatus 1B includes the information output device 44B and the ECU 25B that controls the information output device 44B. Each of these apparatuses can be used to notify the driver of information. On the other hand, the information output device 44A is, for example, a head-up display, and the information output device 43B is a display device for instruments. These apparatuses commonly make an in-vehicle notification but can adopt different display devices.

Outside-Vehicle Notification

The control apparatus 1A includes the information output device 44A and the ECU 26A that controls the information output device 44A. The control apparatus 1B includes the information output device 43B and the ECU 23B that controls the information output device 43B. Each of these apparatuses can be used to make a notification of information outside the vehicle. On the other hand, the information output device 43A is a direction indicator (hazard lamp), and the information output device 44B is a brake lamp. These apparatuses commonly make an outside-vehicle notification but exhibit different functions.

Difference

While the control apparatus 1A includes the ECU 27A that controls the power plant 50, the control apparatus 1B includes no proprietary ECU that controls the power plant 50. In this embodiment, each of the control apparatuses 1A and 1B can perform steering, braking, and stop maintenance singly. Even if, in one of the control apparatuses 1A and 1B, the performance lowers, power supply is interrupted, or communication is interrupted, it is possible to maintain the stop state by deceleration while suppressing deviation from a lane. As described above, the ECU 21B can output a control command to the ECU 27A via the communication line L2, the gateway GW, and the communication line L1, and the ECU 21B can also control the power plant 50. By providing, in the control apparatus 1B, no proprietary ECU that controls the power plant 50, it is possible to suppress an increase in cost. However, such proprietary ECU may be provided.

[Sensor System]

Detection of Peripheral Status

The control apparatus 1A includes the detection units 31A and 32A. The control apparatus 1B includes the detection units 31B and 32B. Each of these apparatuses can be used to recognize the traveling environment of the vehicle V. On the other hand, the detection unit 32A is a LIDAR and the detection unit 32B is a radar. The LIDAR is generally advantageous in detecting a shape. The radar is generally more advantageous than the LIDAR in terms of cost. By using these sensor having different characteristics, it is possible to improve the performance of recognition of a target and reduce the cost. The detection units 31A and 31B are cameras but cameras having different characteristics may be used. For example, one of the cameras may have a resolution higher than that of the other. The cameras may have different angles of view.

When the control apparatuses 1A and 1B are compared to each other, the detection units 31A and 32A have detection characteristics different from those of the detection units 31B and 32B. In this embodiment, the detection unit 32A is a LIDER, and generally has high performance of detecting the edge of a target, as compared to the radar (detection unit 32B). In addition, the radar generally has relative speed detection accuracy and weather resistance superior to the LIDAR.

If the camera 31A has a resolution higher than that of the camera 31B, the detection units 31A and 32A have detection performance higher than that of the detection units 31B and 32B. By combining a plurality of sensors different in detection characteristic and cost, it may be possible to obtain the cost advantage for the overall system. Furthermore, by combining sensors different in detection characteristic, it is possible to reduce detection omission or erroneous detection, as compared to a case in which the same sensors are redundant.

Vehicle Speed

The control apparatus 1A includes the rotation speed sensor 39. The control apparatus 1B includes the wheel speed sensors 38. Each of these apparatuses can be used to detect the vehicle speed. On the other hand, the rotation speed sensor 39 is used to detect the rotation speed of the output shaft of the automatic transmission TM, and each wheel speed sensor 38 is used to detect the rotation speed of the corresponding wheel. These sensors can commonly detect the vehicle speed but detection targets are different.

Yaw Rate

The control apparatus 1A includes the gyro sensor 33A. The control apparatus 1B includes the yaw rate sensor 33B. Each of these apparatuses can be used to detect the angular velocity around the vertical axis of the vehicle V. On the other hand, the gyro sensor 33A is used to determine the course of the vehicle V, and the yaw rate sensor 33B is used to, for example, control the orientation of the vehicle V. These sensors can commonly detect the angular velocity of the vehicle V but have different use purposes.

Steering Angle and Steering Torque

The control apparatus 1A includes a sensor that detects the rotation amount of the motor of the electric power steering device 41A. The control apparatus 1B includes the steering angle sensor 37. Each of these apparatuses can be used to detect the steering angle of each front wheel. In the control apparatus 1A, it is possible to suppress an increase in cost by using the sensor that detects the rotation amount of the motor of the electric power steering device 41A without additionally providing the steering angle sensor 37. However, the steering angle sensor 37 may be additionally provided in the control apparatus 1A.

Since each of the electric power steering devices 41A and 41B includes a torque sensor, each of the control apparatuses 1A and 1B can recognize a steering torque.

Braking Operation Amount

The control apparatus 1A includes the operation detection sensor 34*b*. The control apparatus 1B includes the pressure sensor 35. Each of these apparatuses can be used to detect the braking operation amount of the driver. On the other hand, the operation detection sensor 34*b* is used to control distribution of the braking forces generated by the four brake devices 51 and the braking force generated regenerative braking of the motor M, and the pressure sensor 35 is used for, for example, orientation control. These sensors commonly detect the braking operation amount but have different use purposes.

[Power Supply]

The control apparatus 1A receives supply of power from the power supply 7A, and the control apparatus 1B receives supply of power from the power supply 7B. Even if power supply of one of the power supplies 7A and 7B is interrupted or decreases, power is supplied to one of the control apparatuses 1A and 1B, and it is thus possible to ensure the power supply more reliably, and improve the reliability of the control system 1. If the power supply of the power supply 7A is interrupted or decreases, it is difficult to perform communication between the ECUs by interposing the gateway GW provided in the control apparatus 1A. However, in the control apparatus 1B, the ECU 21B can communicate with the ECUs 22B to 24B and 44B via the communication line L2.

[Redundancy in Control Apparatus 1A]

The control apparatus 1A includes the ECU 20A that controls automated driving and the ECU 29A that controls traveling support, and includes two control units that control traveling.

<Example of Control Function>

Control functions executable in the control apparatus 1A or 1B include a traveling-related function concerning control of driving, braking, and steering of the vehicle V and a notification function concerning notification of information to the driver.

Examples of the traveling-related function are a lane keep control function, a lane deviation suppression control function (road deviation suppression control function), a lane change control function, a preceding vehicle tracking control function, a collision reduction brake control function, and an erroneous start suppression control function. Examples of the notification function are an adjacent vehicle notification control function and a preceding vehicle start notification control function.

The lane keep control function is one of functions of controlling the position of the vehicle with respect to a lane, and controls the vehicle to travel automatically (independently of a driving operation of the driver) on a traveling track set in the lane. The lane deviation suppression control function is one of functions of controlling the position of the vehicle with respect to a lane, and detects a white line or a median strip and performs steering automatically so the vehicle does not exceed a predetermined traveling lane. The lane deviation suppression control function and the lane keep control function are different.

The lane change control function controls to cause the vehicle to automatically move to the adjacent lane from the lane on which the vehicle currently travels. The preceding vehicle tracking control function controls the vehicle to automatically track another vehicle traveling in front of the self-vehicle. The collision reduction brake control function controls to support collision avoidance by automatic braking when the possibility of collision with an obstacle in front of the vehicle becomes high. The erroneous start suppression control function controls to restrict acceleration of the vehicle when the driver performs a predetermined amount or more of an acceleration operation in the stop state of the vehicle, thereby suppressing a sudden start.

The adjacent vehicle notification control function controls to notify the driver of the existence of another vehicle traveling on the lane adjacent to the traveling lane of the self-vehicle, and notifies the driver of, for example, the existence of another vehicle traveling on the lateral side or rear side of the self-vehicle. The preceding vehicle start notification control function controls to make a notification that the self-vehicle and another vehicle in front of it are in a stop state and the other vehicle starts. These notifications can be made by the above-described in-vehicle notification devices (information output devices 43A and 44B).

The ECUs 20A, 29A, and 21B can share and execute these control functions. It is possible to appropriately select a specific control function to be applied to a specific ECU.

First Embodiment

Control according to the present invention will be described below. As described above, the vehicle according to the embodiment of the present invention includes the plurality of detection means that include a plurality of kinds of detection means in accordance with detection targets and the like.

A control system according to this embodiment includes high-precision map information (to be referred to as a high-precision map hereinafter), or can refer to the high-precision map appropriately, and acquire information of a road on which a vehicle currently travels or is to travel. The arrangement of a highway will be exemplified but the present invention is not limited to this.

[Road Surface State]

Figure 4:
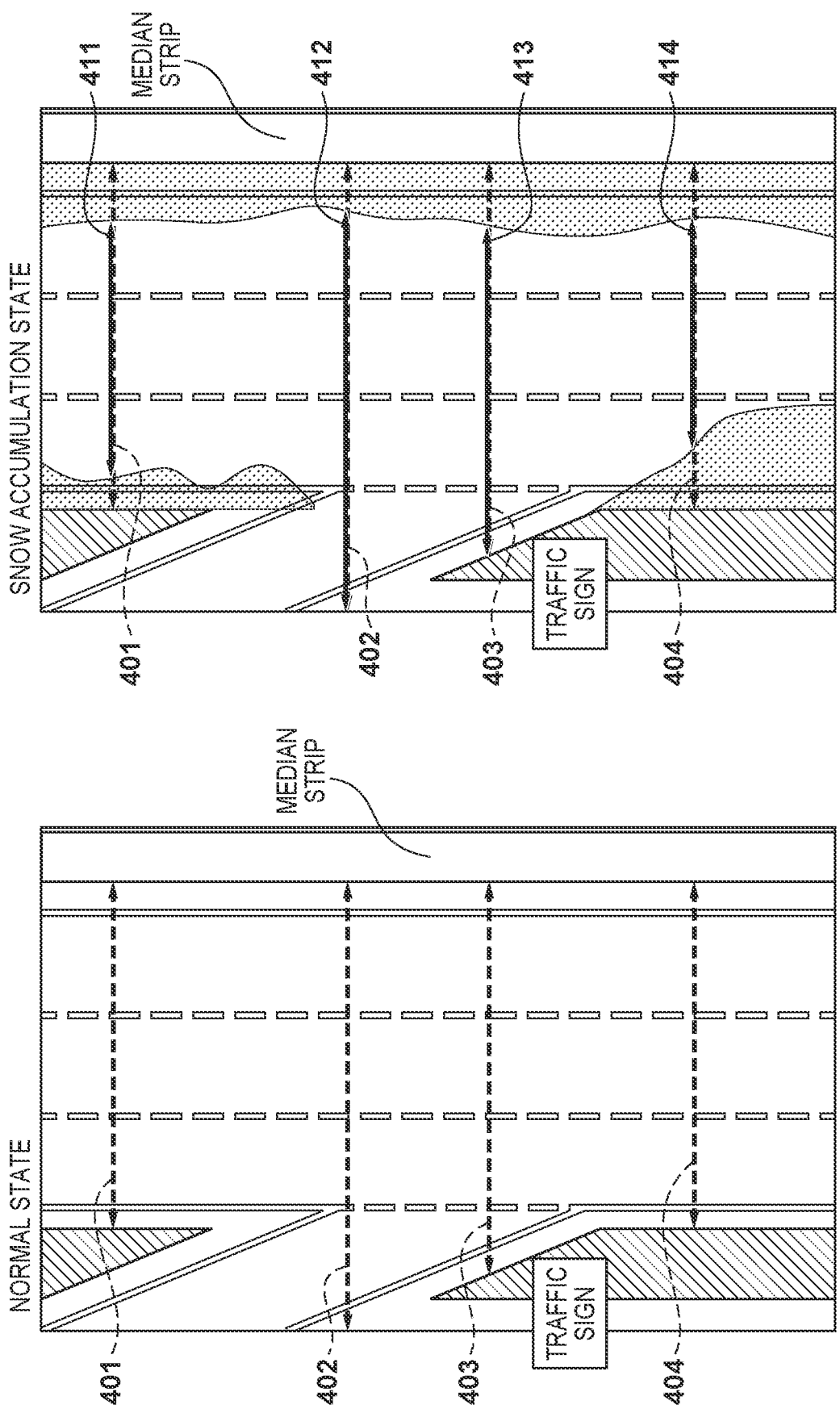
FIGS. 4A and 4B are views for explaining the state of a road surface.

FIGS. 4A and 4B are views for explaining the state of a road surface on which a vehicle travels according to the present invention. FIG. 4A is a view showing the state of the road surface in a normal state. A road formed from three lanes in one direction is exemplified. In FIG. 4A, a median strip is located at the right end, and a branching lane is shown at the left end.

Referring to FIG. 4A, broken-line arrows 401 to 404 each represent the distance (the length in a lateral direction perpendicular to a traveling direction) between the boundaries of the road in the high-precision map. Note that in FIG. 4A, since there is a branch, the distance between the boundaries changes depending on the position even for the same three lanes. In the normal state, assume that the distance between the boundaries indicated in the high-precision map is equal (or almost equal) to the actual distance between the boundaries detected by the detection means.

Note that the full width of the road may be a width (from the left end of the left shoulder of the road to the right end of the right shoulder of the road) including the left and right shoulders of the road, as shown in FIGS. 4A and 4B, or the width (from the left end of the white line of the leftmost lane to the right end of the white line of the rightmost lane) of all the lanes except for the shoulder portions.

FIG. 4B is a view showing the state of the road surface in a snow accumulation state. As shown in FIG. 4B, assume that snow is accumulated on the road surface, and the in-vehicle detection means cannot correctly detect the boundaries and lanes of the road. In FIG. 4B, solid-line arrows 411 to 414 each represent the distance between the detected boundaries. That is, in the snow accumulation state, the detected distance is equal to or shorter than the distance between the road boundaries indicated in the high-precision map, and even at the same position, (distance between road boundaries on high-precision map)≥(distance between road boundaries based on detection result of detection means)

is satisfied. Note that the vehicle cannot always travel on the road surface on which snow is accumulated. In addition, although FIG. 4B shows a state in which snow is accumulated continuously from the boundary sides of the road, a state in which snow is accumulated to cover a white line like an island in a portion on the road may be included.

Figure 5:
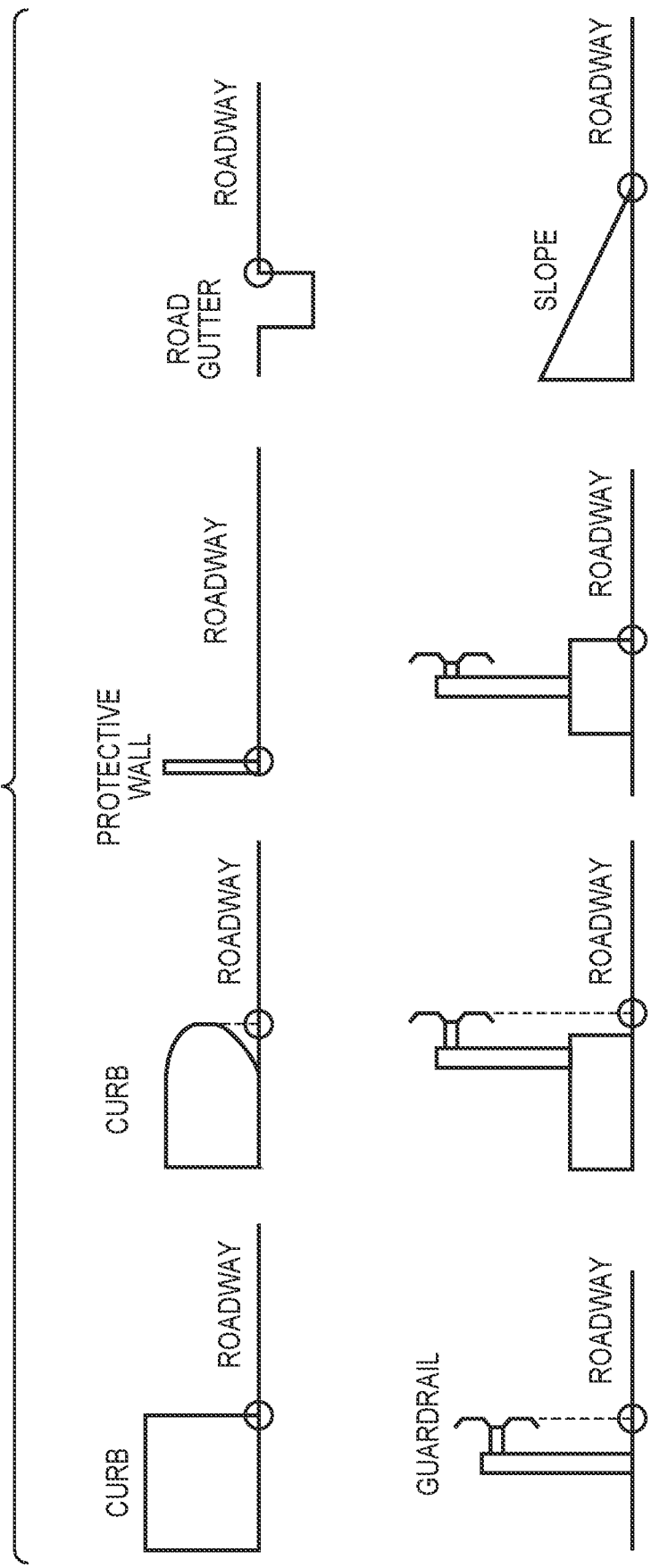
FIG. 5 is a view for explaining examples of a physical structure for specifying a boundary of a road.

FIG. 5 is a view for explaining a position indicating the boundary of the road according to this embodiment. If the detection means detects a structure located around the vehicle, the actual boundary of the road is specified in accordance with the position of the structure. In this embodiment, each position represented by a circle in FIG. 5 is processed as the boundary of the road.

Examples of a structure for specifying the boundary of the road are a curb, protective wall, road gutter, guardrail, and slope. Note that eight examples are exemplified but the present invention is not limited to them.

The above examples have been exemplified as a structure for specifying the boundary of the road. However, the accuracy when specifying a position may be further improved by associating a specific feature such as a traffic sign indicated in the high-precision map with a specific feature detected by the detection means. For example, the position of a lane, a white line, or a shoulder of a road may be specified based on the positional relationship between the positions of the traffic sign and the boundary of the road.

This embodiment will describe control of automated driving when a difference is generated between the distance (to be referred to as a "predetermined width" hereinafter) between the road boundaries indicated in the high-precision map and the distance (to be referred to as a "detected width" hereinafter) between the road boundaries obtained based on the detection result of the detection means.

[Control Procedure]

A control procedure according to this embodiment will be described with reference to FIG. 6. Note that this processing is implemented when the ECU executes the processing based on a predetermined program and cooperates with the above-described control units. Note that control to be described below is not limited to control by either of control apparatuses 1A and 1B, and the main body of the processing will be described by collectively defining the control apparatuses 1A and 1B as a control apparatus 1.

The processing procedure shown in FIG. 6 will be described by assuming that the processing starts at the start of automated driving.

In step S601, the control apparatus 1 acquires position information of a self-vehicle. The information may be acquired by a GPS or by communicating with a communication means arranged on the periphery.

In step S602, the control apparatus 1 acquires, from the high-precision map, information of a road on which the self-vehicle travels. As for the range of the road to be acquired, information of the entire route to travel may be acquired collectively, or information of a predetermined range (for example, a distance from the current position of the self-vehicle) may be acquired.

In step S603, the control apparatus 1 acquires peripheral information of the self-vehicle by the detection means. The peripheral information includes information pertaining to the state of a road surface.

In step S604, the control apparatus 1 calculates a distance (detected width) between the boundaries of the road during traveling based on the peripheral information acquired in step S603. The detected width corresponds to a region detected as a travelable region.

As described above, the vehicle according to this embodiment includes the plurality of detection means, and the plurality of detection means include different kinds of detection means. Therefore, each detection means has a different characteristic, and has a different detectable range and target.

In addition, a target to be detected is different depending on an installation position. Therefore, in this embodiment, a detected width is calculated by combining detection results detected by the plurality of different kinds of detection means.

In step S605, the control apparatus 1 compares the predetermined width defined by the information acquired in step S602 with the detected width calculated in step S604. If the predetermined width is larger than the detected width (YES in step S605), the process advances to step S606; otherwise (NO in step S605), the process advances to step S607.

In step S606, the control apparatus 1 controls to perform automated driving based on the detected width calculated in step S604. Details of the operation will be described later with reference to FIG. 7. After the processing in this step, the process returns to step S601 to continue the processing.

In step S607, the control apparatus 1 controls to perform automated driving based on the predetermined width. Automated driving based on the predetermined width is the same as conventional automated driving, and a detailed description thereof will be omitted. Note that if automated driving based on the detected width is performed by the above-described control processing, the control may be switched to control by conventional automated driving. After the processing in this step, the process returns to step S601 to continue the processing.

Figure 6:
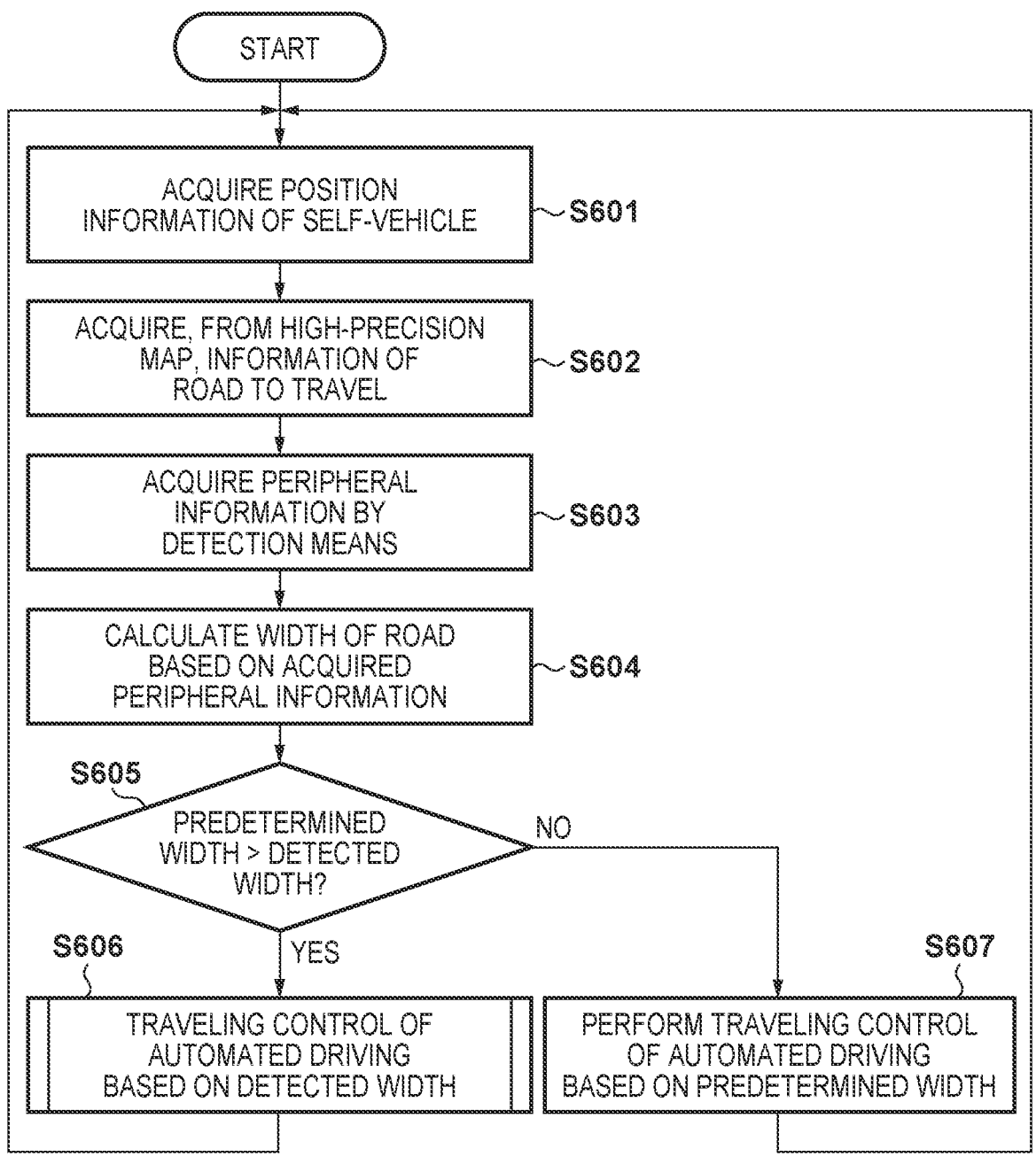
FIG. 6 is a flowchart illustrating control processing of automated driving according to the first embodiment.

Note that the processing shown in FIG. 6 ends when, for example, the vehicle reaches a destination or an occupant instructs to end automated driving.

(Traveling Control of Automated Driving Based on Detected Width)

Figure 7:
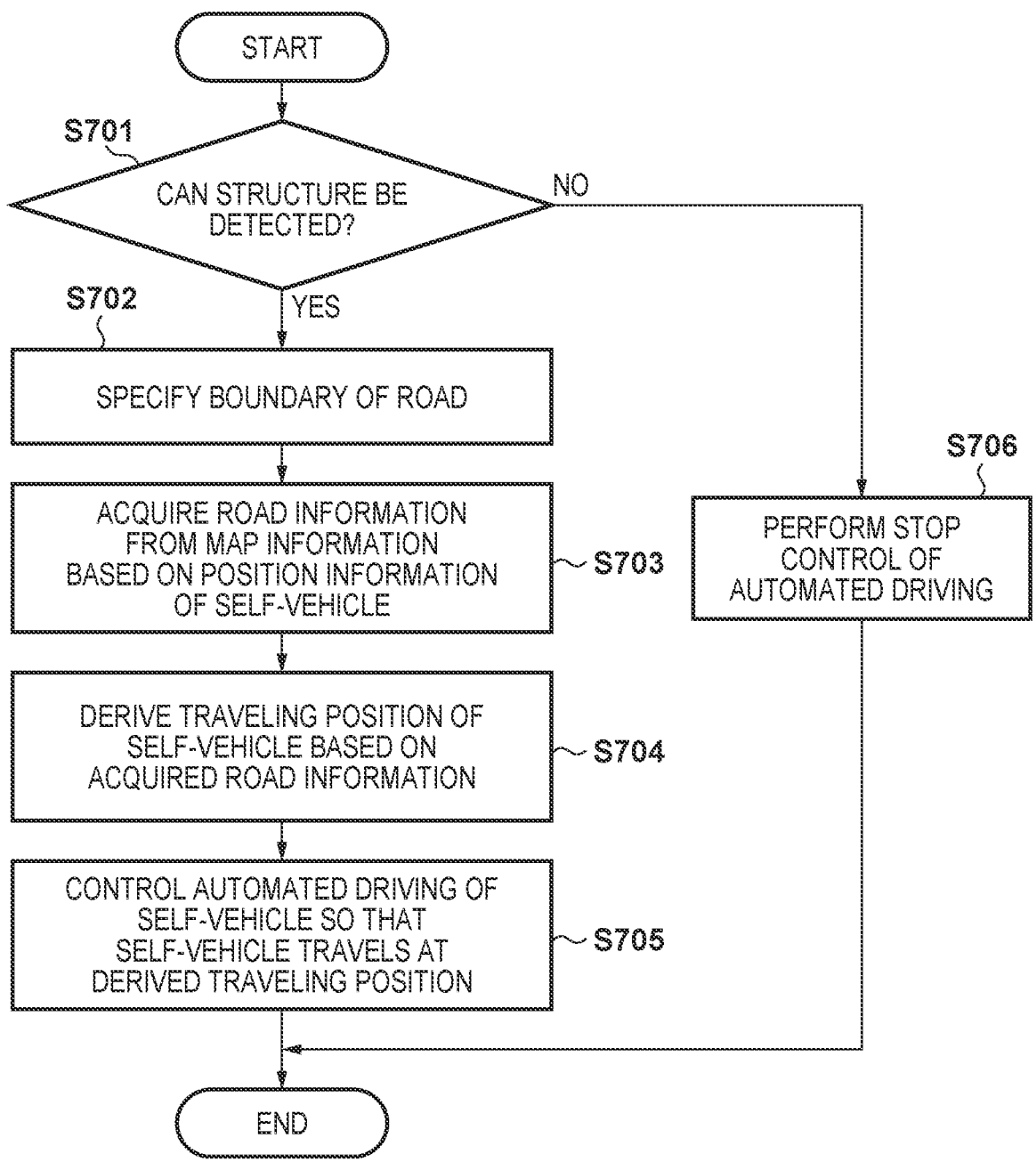
FIG. 7 is a flowchart illustrating traveling control of automated driving based on a detected width according to the first embodiment.

FIG. 7 shows the processing procedure of traveling control of automated driving based on the detected width according to this embodiment, and corresponds to step S606 of FIG. 6.

In step S701, the control apparatus 1 determines, based on the peripheral information acquired in step S603 of FIG. 6, whether a structure for specifying the boundary of the road is detected. The structure may be a structure located on each side of the road on which the self-vehicle travels, or a structure on one side. As described above, the vehicle according to this embodiment includes the plurality of detection means, and the plurality of detection means include different kinds of detection means. Therefore, each detection means has a different characteristic, and has a different detectable range and target. In addition, a target to be detected is different depending on an installation position. Therefore, this embodiment assumes that a structure is detected by combining detection results detected by the plurality of different kinds of detection means. If a structure is detected (YES in step S701), the process advances to step S702; otherwise (NO in step S701), the process advances to step S706.

In step S702, the control apparatus 1 specifies the boundary of the road based on the detected structure. This specifying processing is performed in accordance with the position of the structure, as shown in FIG. 5. In this boundary specifying processing, if structures on both sides of the road during traveling can be detected in step S701, the positions of the boundaries on both sides may be specified.

In step S703, the control apparatus 1 acquires, from the high-precision map information, information of the distance from the boundary of the road to the white line of a lane and information of the width of the lane based on the position information of the self-vehicle. For example, as the distance from the boundary of the road to the white line of the lane, the distance from the boundary of the right shoulder of the road to the right white line of the lane is acquired. In addition, as the width of the lane, the distance between the left and right white lines of the lane is acquired. If, based on the high-precision map, the road is formed from a plurality of lanes, a plurality of pieces of information may be acquired. If the positions of the boundaries on both sides of the road can be specified in step S702, information of the distance from each side may be acquired, or only information with reference to the boundary closer to the current traveling position of the self-vehicle may be acquired. After that, the process advances to step S704.

In step S704, the control apparatus 1 derives the traveling position of the self-vehicle based on the boundary of the road specified in step S702 and the information acquired in step S703. For example, if the center of the lane is set as the traveling position of the self-vehicle, the traveling position can be derived by:

(traveling position of self-vehicle=(distance from boundary of road to white line of lane)+(width of lane)/2

Note that in this embodiment, the traveling lane corresponds to a lane included in a region detected as a travelable region in step S604 of FIG. 6.

The method of deriving the traveling position is not limited to the above method, and another formula may be used. In a road formed from a plurality of lanes, the traveling position may be derived so as to change the distances from the left and right white lines in accordance with a peripheral traveling vehicle (offset traveling). If the positions of the boundaries on both sides of the road can be specified in step S702, the traveling position of the self-vehicle may be derived based on the information of the distance from each side, thereby deriving the traveling position having higher safety.

In step S705, the control apparatus 1 performs control so that the self-vehicle travels at the traveling position derived in step S704. Then, the processing procedure ends.

In step S706, the control apparatus 1 performs stop control of automated driving. As stop control, for example, an occupant is notified that it is difficult to continue automated driving and thus automated driving is to be stopped or the level of automated driving is lowered to the level within a sustainable range. Stop control may be alternative control (to be described later). After that, the processing procedure ends.

In this embodiment, examples of alternative control are as follows.
  Deceleration of traveling speed of self-vehicle
  Movement in direction opposite to lane where another vehicle is located (offset traveling)
  Lane change (if there is a lane on change side)
  Switching of driving mode
  Switching from automated driving to normal driving (manual driving)
  Change of level of automated driving (for example, change from level 3 to level 2)

Note that alternative control is not limited to them, and control may be performed by combining these control operations. A variation amount (for example, a deceleration amount or offset amount) may be decided based on another peripheral vehicle, a snow accumulation amount, or other environment information.

Stop control of automated driving is not limited to lowering of the level of automated driving (end of automated driving). For example, the lowered level of automated driving may be controlled not to rise again. For example, during congestion or the like, control is performed to prohibit transition to a higher level of automated driving (maintain the level of automated driving at a low level). An example of control of lowering the level of automated driving is transition from automated driving corresponding to hands-off driving to automated driving corresponding to hands-on driving. At this time, notification contents may be changed in accordance with contents of control (for example, contents of transition of the level of automated driving).

Note that the detected width and the predetermined width are compared in step S605 of FIG. 6. However, with reference to the relationship between the boundary of the road and the specific feature, a portion where the detected width and the predetermined width overlap each other on the road may be specified. Based on the range determined as an overlapping range, a travelable region may be specified.

In addition to simply obtaining of a ratio at which the detected width overlaps the predetermined width of the road, for example, a travelable range may be specified in consideration of the number of lanes and the positions of the shoulders of the road and the like, and then an overlapping range may be calculated within the specified range.

According to this embodiment, even if neither a white line nor the boundary of the road is detected due to snow accumulation, it is possible to continue automated driving more safely and appropriately.

Second Embodiment

In the first embodiment, if the width of the travelable road detected by the detection means is compared to the width on the map (high-precision map information), and the detected width is smaller, a traveling position is specified in accordance with the position of the boundary of the road, thereby controlling automated driving. In this embodiment, an arrangement of specifying a travelable region of a road in accordance with the traveling status of a vehicle traveling on the periphery will be described.

A description of a part, such as a vehicle arrangement, that overlaps the first embodiment will be omitted, and different points will be described.

[Road Surface State]

Figure 8:
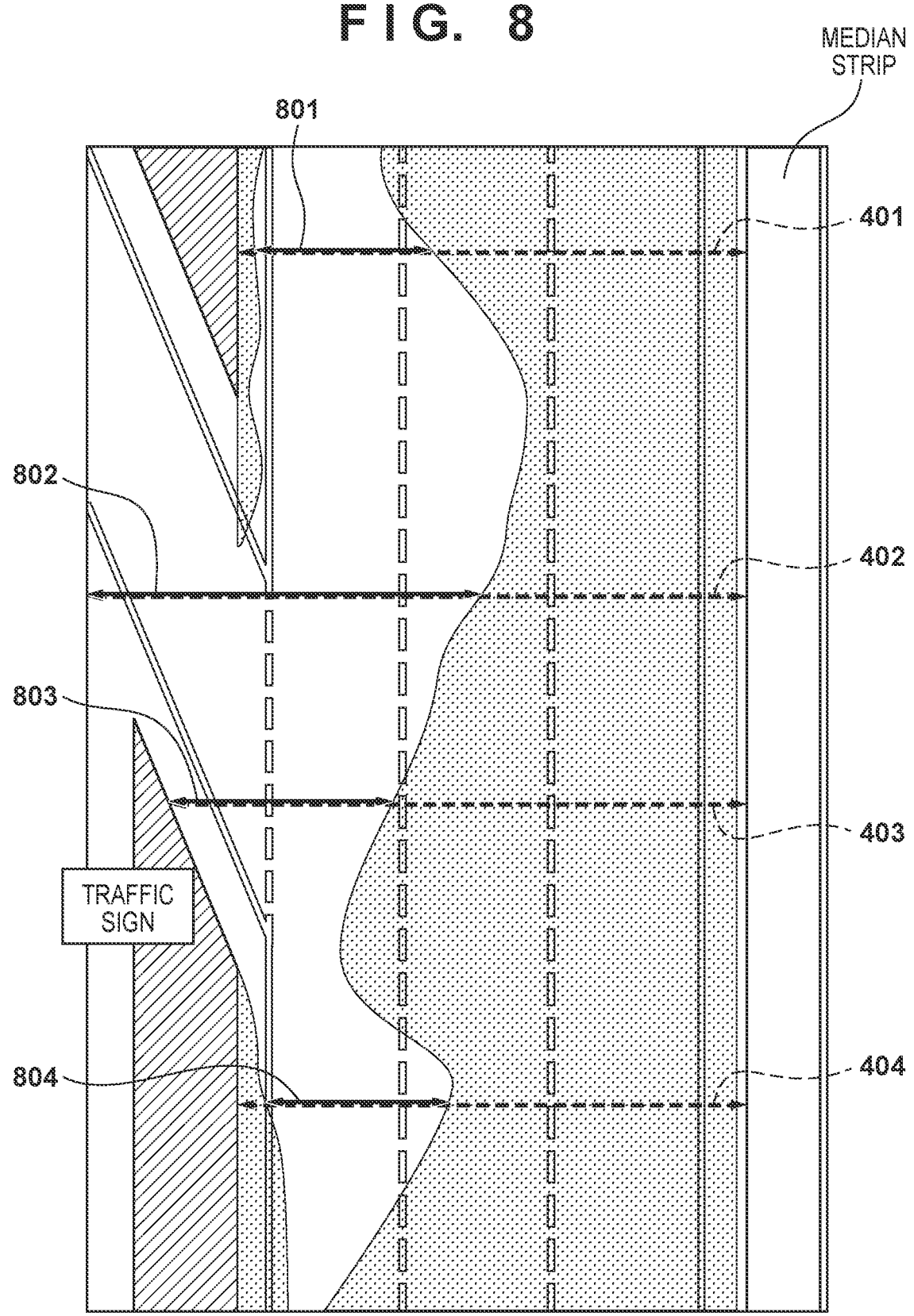
FIG. 8 is a view for explaining the state of a road surface.

FIG. 8 is a view for explaining an example of a road surface state. FIG. 8 shows a road formed from three lanes, and shows a state in which a lane located at the rightmost position is covered with snow as a whole and neither a white line nor the boundary of the road can be detected. Broken-line arrows 401 to 404 are the same as those shown in FIGS. 4A and 4B. Solid-line arrows 801 to 804 represent widths detected in this example.

This embodiment will describe an arrangement in which the above-described lane is processed as a travelable region if another vehicle traveled or is traveling.

[Control Procedure]

Figure 9:
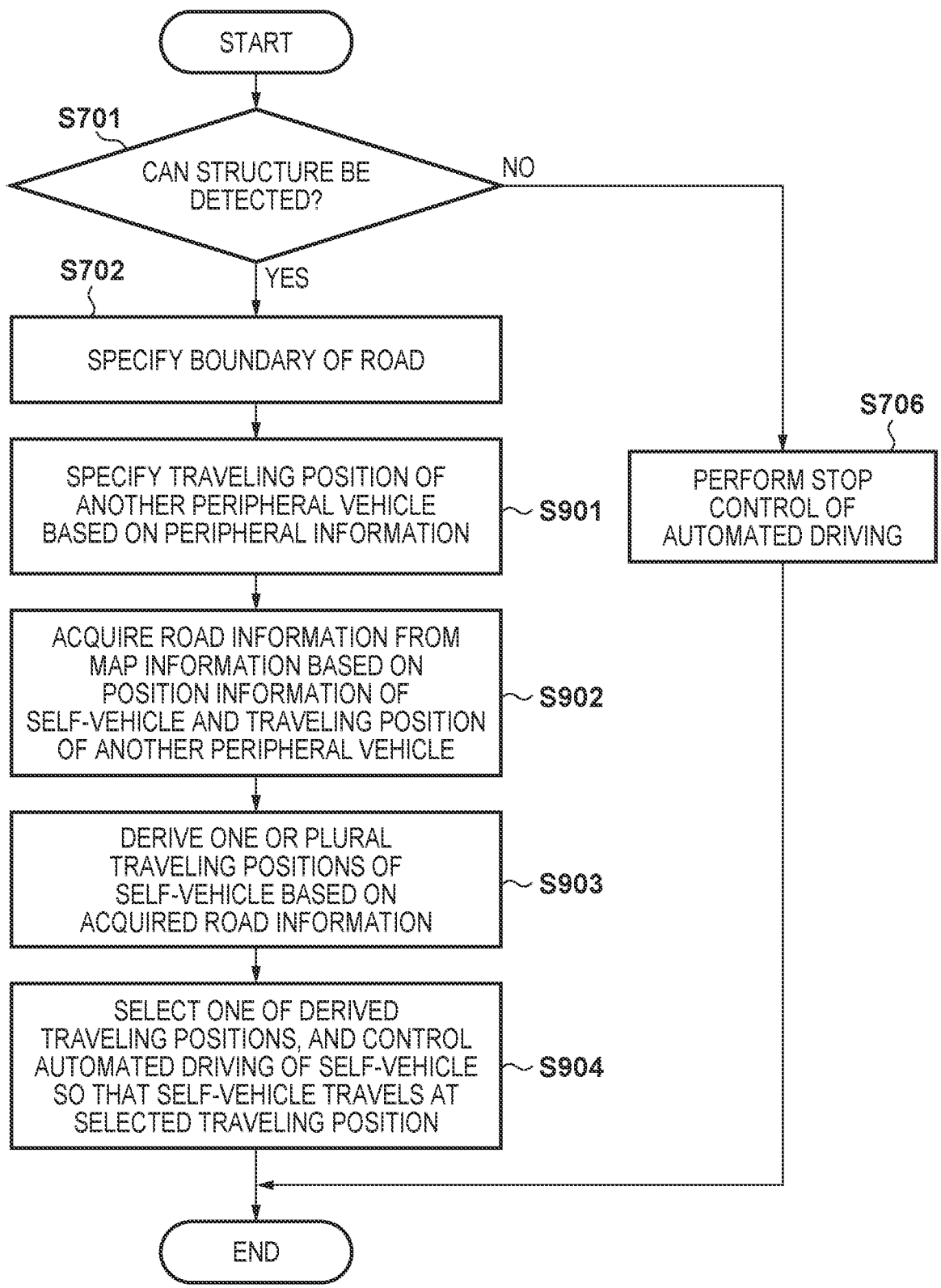
FIG. 9 is a flowchart illustrating control processing of automated driving according to the second embodiment.

FIG. 9 shows the processing procedure of traveling control of automated driving based on the detected width according to this embodiment, and corresponds to step S606 of FIG. 6 described in the first embodiment.

After processing in step S702, the process advances to step S901. In step S901, a control apparatus 1 specifies the traveling position of a peripheral vehicle based on peripheral information acquired in step S603 of FIG. 6. The traveling position may be a traveling position in a lane where a self-vehicle travels or a traveling position in an adjacent lane. Alternatively, the traveling position may be a traveling position in a state in which the peripheral vehicle is detected by a detection means at this time, or a traveling position specified based on a rut although no peripheral vehicle is detected by the detection means at this time. In this embodiment, a lane where another vehicle travels is processed as a lane where the self-vehicle can also travel. After that, the process advances to step S902.

In step S902, the control apparatus 1 acquires, from high-precision map information, information of a distance from the boundary of the road to the white line of a lane and information of the width of the lane based on the position information of the self-vehicle. For example, as the distance from the boundary of the road to the white line of the lane, a distance from the boundary of the right shoulder of the road to the right white line of the lane is acquired. In addition, as the width of the lane, the distance between the left and right white lines of the lane is acquired. Based on the traveling position of the peripheral vehicle acquired in step S901, information of the lane associated with the traveling position is acquired together. After that, the process advances to step S903.

In step S903, the control apparatus 1 derives the traveling position of the self-vehicle based on the boundary of the road specified in step S702 and the information acquired in step S903. For example, if the center of the lane is set as the traveling position of the self-vehicle, the traveling position can be derived by:

(traveling position 1 of self-vehicle)=(distance from boundary of road to white line of lane)+(width of lane)/2

Furthermore, in accordance with the traveling position of the peripheral vehicle, the traveling position in the lane where the self-vehicle can travel can be derived by:

(traveling position 2 of self-vehicle)=(distance from boundary of road to white line of lane where another vehicle traveled)+(width of lane)/2

If there are more travelable lanes, a traveling position for each lane is derived. That is, in this embodiment, in addition to the travelable region detected in step S604, a lane included in a region where a peripheral vehicle traveled is derived as a candidate of a traveling position. Note that no region where another vehicle traveled is detected on the periphery, one traveling position is derived.

In step S904, the control apparatus 1 performs control so that the self-vehicle travels at the traveling position derived in step S903. If a plurality of travelable traveling positions (lanes) are obtained, one of them is selected to perform traveling control. As a traveling position selection method, for example, a position closest to the current position may be selected, or one of the positions may be selected based on a peripheral status (the existence of another vehicle or the state of the road surface) at this time. Then, the processing procedure ends.

Note that when a region is determined as a travelable region, the determination processing is performed based on a currently traveling vehicle or a rut. The present invention, however, is not limited to this. The determination processing may be performed based on the number of other vehicles traveling on the lane. Furthermore, if there are a plurality of lanes, the determination processing may be performed based on a ratio of the number of other vehicles traveling on the lane to the number of other vehicles currently traveling. With this arrangement, the safety of the travelable region (lane) may be ensured.

According to this embodiment, even in a state in which the state of the road surface cannot be detected due to snow accumulation, it is possible to specify an appropriate travelable region.

Third Embodiment

In the first embodiment, if the width of the travelable road detected by the detection means is compared to the width on the map (high-precision map information), and the detected width is smaller, a traveling position is specified in accordance with the position of the boundary of the road, thereby controlling automated driving. This embodiment will describe an arrangement of controlling automated driving in accordance with the difference between a predetermined width and a detected width.

A description of a part, such as a vehicle arrangement, that overlaps the first embodiment will be omitted, and different points will be described.

[Control Procedure]

A control procedure according to this embodiment will be described with reference to FIG. 10. Note that this processing is implemented when an ECU executes the processing based on a predetermined program and cooperates with the above-described control units. Note that control to be described below is not limited to control by either of control apparatuses 1A or 1B, and the main body of the processing will be described by collectively defining the control apparatuses 1A and 1B as a control apparatus 1.

The processing procedure shown in FIG. 10 will be described by assuming that the processing starts at the start of automated driving.

In step S1001, the control apparatus 1 acquires position information of a self-vehicle. The information may be acquired by the GPS of the self-vehicle or by communicating with a communication means arranged on the periphery.

In step S1002, the control apparatus 1 acquires, from a high-precision map, information of a road on which the self-vehicle travels. As for the range of the road to be acquired, information of the entire route to travel may be acquired collectively, or information of a predetermined range (for example, a distance from the current position of the self-vehicle) may be acquired.

In step S1003, the control apparatus 1 acquires peripheral information of the self-vehicle by a detection means. The peripheral information includes information pertaining to the state of a road surface.

In step S1004, the control apparatus 1 calculates a distance (detected width) between the boundaries of the road during traveling based on the peripheral information acquired in step S1003.

In step S1005, the control apparatus 1 calculates the difference between the predetermined width acquired in step S1002 and the detected width calculated in step S1004.

In step S1006, the control apparatus 1 acquires a predetermined threshold. The threshold may be defined in accordance with the position of the road as a comparison target, or a different value may be used as the threshold in accordance with the number of lanes or the width of the road defined in the high-precision map. Assume that the threshold is held in a storage unit.

In step S1007, the control apparatus 1 determines whether the difference calculated in step S1005 is equal to or larger than the threshold acquired in step S1006. If the difference is equal to or larger than the threshold (YES in step S1007), the process advances to step S1008; otherwise (NO in step S1007), the process advances to step S1009.

In step S1008, the control apparatus 1 performs alternative control. After that, the process returns to step S1001 to continue the processing.

In this embodiment, examples of alternative control are as follows.

Deceleration of self-vehicle
Lane change (if there is a changeable lane)
Switching of driving mode
Switching from automated driving to normal driving (manual driving)
Change of level of automated driving (for example, change from level 3 to level 2)

Note that alternative control is not limited to them, and control may be performed by combining these control operations. A variation amount (for example, a deceleration amount or offset amount) may be decided based on another peripheral vehicle, a snow accumulation amount, or other environment information.

In step S1009, the control apparatus 1 controls to perform automated driving based on the predetermined width. Automated driving based on the predetermined width is the same as conventional automated driving, and a detailed description thereof will be omitted. Note that if alternative control in step S1008 is performed by the above control processing, the control may be switched to control by conventional automated driving. After the processing in this step, the process returns to step S1001 to continue the processing.

Figure 10:
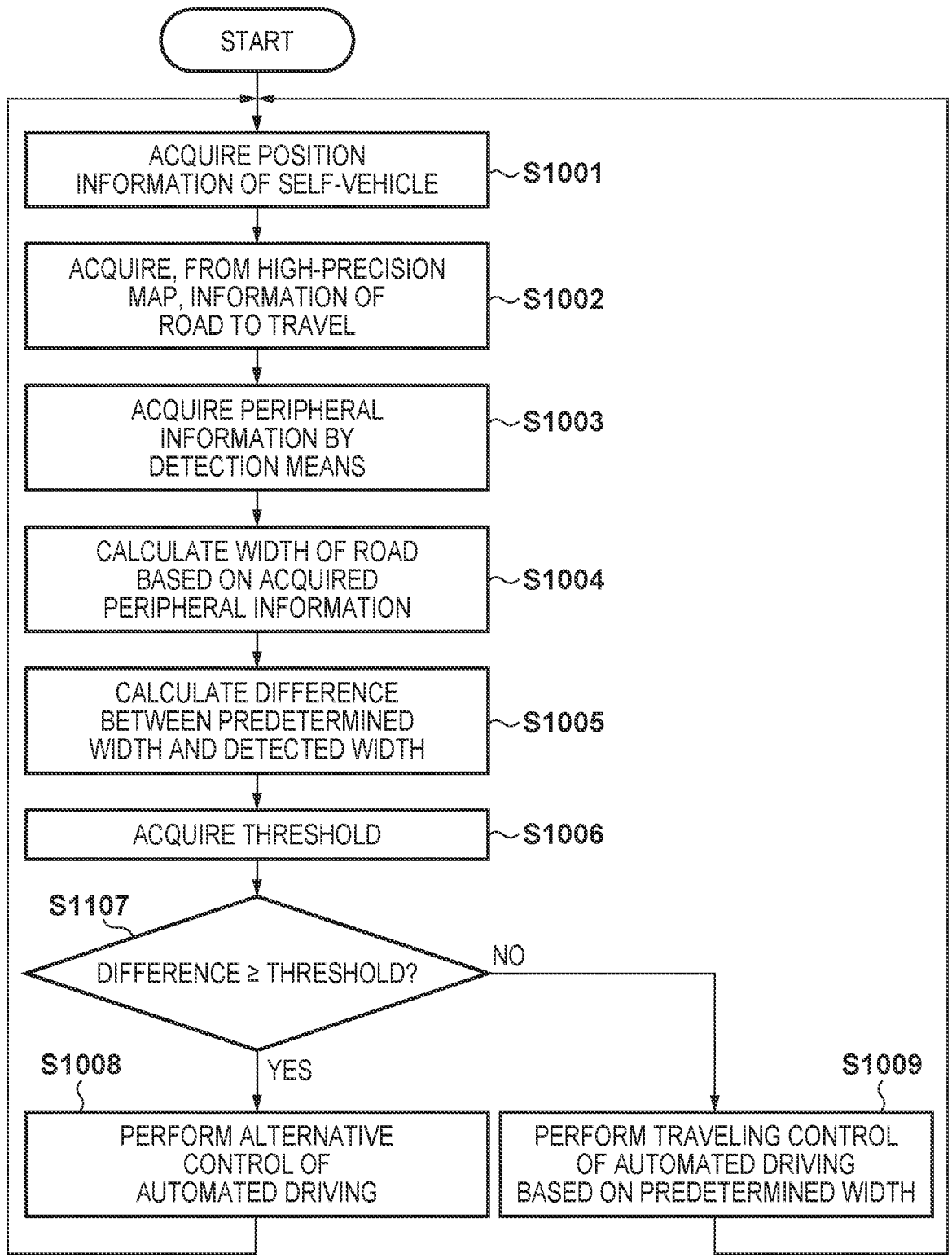
FIG. 10 is a flowchart illustrating control processing of automated driving according to the third embodiment.

Note that the processing shown in FIG. 10 ends when, for example, the vehicle reaches a destination or an occupant instructs to end automated driving.

According to this embodiment, it is possible to control automated driving appropriately based on the detected road information.

Fourth Embodiment

The third embodiment has explained the arrangement of controlling automated driving in accordance with the difference between the predetermined width and the detected width. This embodiment will describe an arrangement of switching control using a plurality of thresholds for a difference.

A description of a part, such as a vehicle arrangement, that overlaps the third embodiment will be omitted, and different points will be described.

[Control Procedure]

A control procedure according to this embodiment will be described with reference to FIG. 11. Note that this processing is implemented when an ECU executes the processing based on a predetermined program and cooperates with the above-described control units. Note that control to be described below is not limited to control by either of control apparatuses 1A or 1B, and the main body of the processing will be described by collectively defining the control apparatuses 1A and 1B as a control apparatus 1.

The processing procedure shown in FIG. 11 will be described by assuming that the processing starts at the start of automated driving. Steps S1101 to S1105 of FIG. 11 are the same as steps S1001 to S1005 of FIG. 10.

In step S1106, the control apparatus 1 acquires predetermined first and second thresholds. The first and second thresholds may be defined in accordance with the position of a road as a comparison target, or different values may be used as the first and second thresholds in accordance with the number of lanes or the width of the road defined in a high-precision map. Assume that the thresholds are held in a storage unit. Note that the first and second thresholds have a relationship given by:

(second threshold)>(first threshold)

The following description assumes that, as for the first and second thresholds, if the difference exceeds the second threshold, this means that it is more difficult to continue normal automated driving. For example, the first threshold may be set by setting a range from the boundary of the road to a position of half or less of the end lane as a snow accumulation range. On the other hand, the second threshold may be set by assuming, for example, a case in which one lane of the road including three lanes is entirely covered with snow.

In step S1107, the control apparatus 1 determines whether the difference calculated in step S1105 is equal to or larger than the first threshold acquired in step S1106. If the difference is equal to or larger than the first threshold (YES in step S1107), the process advances to step S1108; otherwise (NO in step S1107), the process advances to step S1111.

In step S1108, the control apparatus 1 determines whether the difference calculated in step S1105 is larger than the second threshold acquired in step S1106. If the difference is larger than the second threshold (YES in step S1108), the process advances to step S1109; otherwise (NO in step S1108), the process advances to step S1110.

In step S1109, the control apparatus 1 performs alternative control (heavy degree). After that, the process returns to step S1101 to continue the processing.

In step S1110, the control apparatus 1 performs alternative control (light degree). After that, the process returns to step S1101 to continue the processing.

In this embodiment, examples of alternative control are as follows.

Deceleration of self-vehicle
Lane change (if there is a changeable lane)
Switching of driving mode
Switching from automated driving to normal driving (manual driving)
Change of level of automated driving (for example, change from level 3 to level 2)

Alternative control in step S1109 or S1110 is changed in a degree of control in accordance with the difference between the predetermined width and the detected width. For example, in alternative control of the heady degree, the degree of deceleration may be increased or a lane change may be prohibited. In the case of alternative control of the heavy degree, the level of automated driving is changed from level 3 to level 1, and in the case of alternative control of the light degree, the level of automated driving may be changed from level 3 to level 2 stepwise.

In step S1111, the control apparatus 1 controls to perform automated driving based on the predetermined width. Automated driving based on the predetermined width is the same as conventional automated driving, and a detailed description thereof will be omitted. Note that if alternative control in step S1109 or S1110 is performed by the above control processing, the control may be switched to control by conventional automated driving. After the processing in this step, the process returns to step S1101 to continue the processing.

Figure 11:
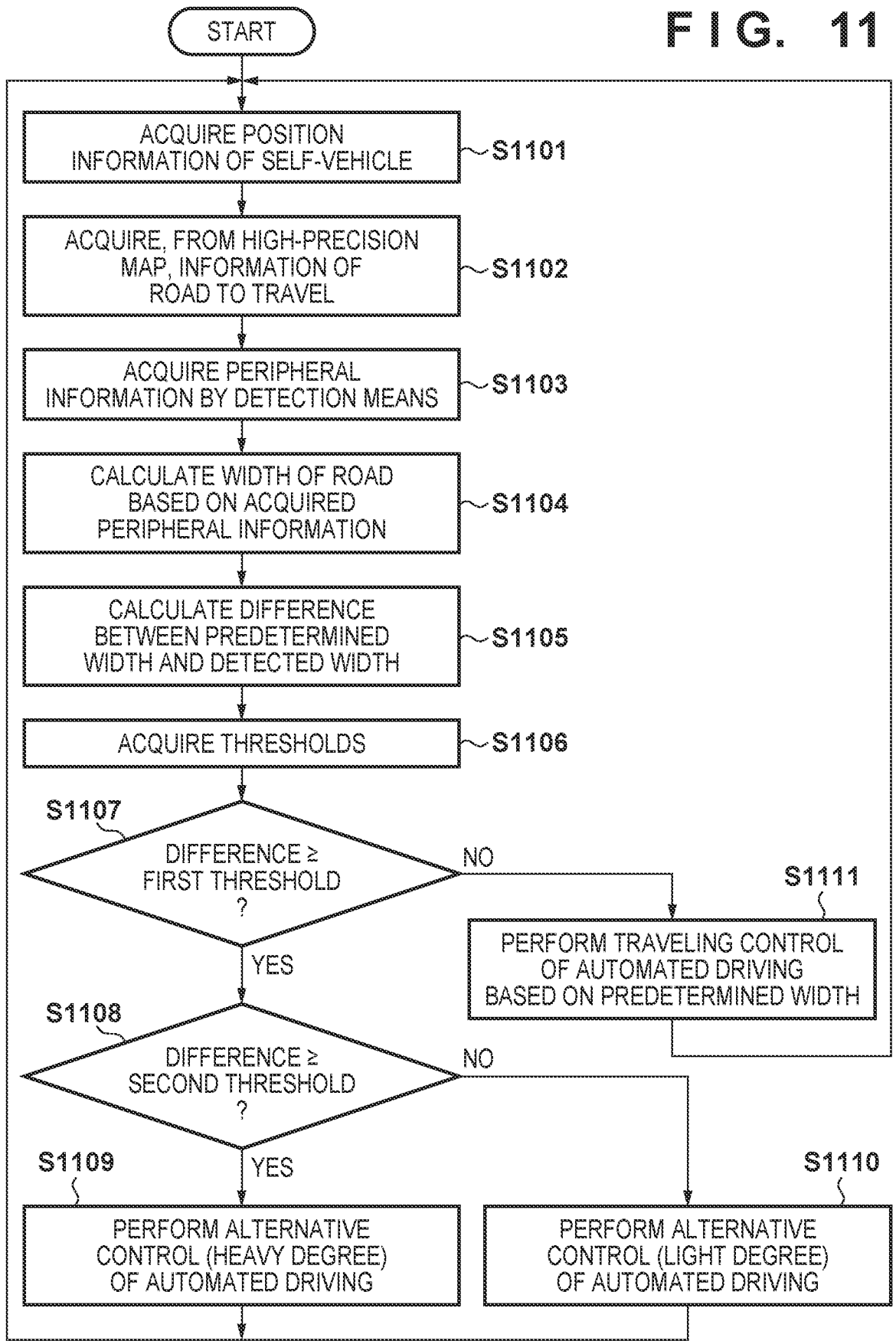
FIG. 11 is a flowchart illustrating control processing of automated driving according to the fourth embodiment.

Note that the processing shown in FIG. 11 ends when, for example, the vehicle reaches a destination or an occupant instructs to end automated driving.

According to this embodiment, it is possible to control automated driving appropriately based on the detected road information.

Summary of Embodiments

There is provided a traveling control system according to the above embodiment, comprising:

a first acquisition unit (for example, 21A, 21B) configured to acquire peripheral information of a self-vehicle;

a second acquisition unit (for example, 28a, 28A) configured to acquire predetermined road information;

a specifying unit (for example, 2A, 20A) configured to specify, based on the peripheral information acquired by the first acquisition unit, a width of a road on which the self-vehicle travels; and a control unit (for example, 2A, 20A) configured to perform traveling control based on a smaller one of a width of a road indicated by the road information acquired by the second acquisition unit and the width of the road specified by the specifying unit.

According to the embodiment, even if neither a white line nor the boundary of a road is detected due to snow accumulation, it is possible to continue automated driving more safely and appropriately.

There is provided the traveling control system according to the above embodiment, wherein the control unit performs traveling control based on a common region of the width of the road indicated by the road information acquired by the second acquisition unit and the width of the road specified by the specifying unit.

According to the embodiment, it is possible to continue automated driving more safely and appropriately based on a common region of a detected region and a predetermined region.

There is provided the traveling control system according to the above embodiment, further comprising a second specifying unit (for example, 2A, 20A) configured to specify, based on the peripheral information acquired by the first acquisition unit, a region where another vehicle traveled, wherein if the width of the road specified by the specifying unit is smaller, the control unit performs traveling control based on the region specified by the second specifying unit in addition to a region of the width.

According to the embodiment, it is possible to determine a travelable region based on information of a region where a peripheral vehicle traveled, and continue automated driving appropriately.

There is provided a traveling control system according to the above embodiment, comprising:

a first acquisition unit (for example, 21A, 21B) configured to acquire peripheral information of a self-vehicle;

a second acquisition unit (for example 28a, 28A) configured to acquire predetermined road information;

a specifying unit (for example, 2A, 20A) configured to specify, based on the peripheral information acquired by the first acquisition unit, a width of a road on which the self-vehicle travels; and a control unit (for example, 2A, 20A) configured to switch traveling control of the self-vehicle if a difference between a width of a road indicated by the road information acquired by the second acquisition unit and the width of the road specified by the specifying unit is not smaller than a predetermined threshold.

According to the embodiment, even if there is a region where neither a white line nor the boundary of a road is detected due to snow accumulation, it is possible to continue automated driving more safely and appropriately.

There is provided the traveling control system according to the embodiment, wherein if the difference is not smaller than a first threshold as the predetermined threshold, and is not larger than a second threshold larger than the first threshold, the control unit performs first traveling control, and if the difference is larger than the second threshold, the control unit performs second traveling control that imposes a restriction stricter than the first traveling control.

According to the embodiment, even if there is a region where neither a white line nor the boundary of a road is detected due to snow accumulation, it is possible to continue automated driving more safely and appropriately.

There is provided the traveling control system according to the embodiment, wherein each of the first traveling control and the second traveling control includes one of restrictions concerning a degree of change of a level of automated driving, a degree of deceleration, and a lane change.

According to the embodiment, it is possible to continue automated driving appropriately in accordance with a state of a road surface.

There is provided the traveling control system according to the above embodiment, wherein the first acquisition unit acquires, as peripheral information, information obtained by at least one of a camera, a LIDAR, and a radar.

According to the embodiment, it is possible to acquire peripheral information of a vehicle appropriately in accordance with a characteristic of each detection unit.

There is provided the traveling control system according to the above embodiment, wherein the second acquisition unit acquires the road information from map information.

According to the embodiment, it is possible to acquire predetermined high-precision road information.

There is provided the traveling control system according to the above embodiment, wherein the specifying unit specifies a width of a corresponding road based on a position of a specific feature indicated by the road information acquired by the second acquisition unit and a position of a specific feature indicated by the peripheral information acquired by the first acquisition unit.

According to the embodiment, it is possible to associate the predetermined road information with a state of a road on which the vehicle actually travels with high precision.

There is provided a vehicle control method according to the above embodiment, comprising:

acquiring (for example, S601, S603) peripheral information of a self-vehicle;

acquiring (for example, S602) predetermined road information; specifying (for example, S604), based on the peripheral information acquired in the acquiring the peripheral information, a width of a road on which the self-vehicle travels; and performing (for example, S605-S607) traveling control based on a smaller one of a width of a road indicated by the road information acquired in the acquiring the predetermined road information and the width of the road specified in the specifying.

According to the embodiment, even if neither a white line nor the boundary of a road is detected due to snow accumulation, it is possible to continue automated driving more safely and appropriately.

There is provided a vehicle control method according to the above embodiment, comprising:

acquiring (for example, S1001, S1003) peripheral information of a self-vehicle;

acquiring (for example, S1002) predetermined road information;

specifying (for example, S1004), based on the peripheral information acquired in the acquiring the peripheral information, a width of a road on which the self-vehicle travels; and switching (for example, S1007, S1008) traveling control of the self-vehicle if a difference between a width of a road indicated by the road information acquired in the acquiring the predetermined road information and the width of the road specified in the specifying is not smaller than a predetermined threshold.

According to the embodiment, even if there is a region where neither a white line nor the boundary of a road is detected due to snow accumulation, it is possible to continue automated driving more safely and appropriately.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-178009, filed Sep. 15, 2017, which is hereby incorporated by reference herein in its entirety.

What is claimed is:

1. A traveling control system comprising:
one or more processors; and
a memory storing a program which, when executed by the one or more processors, causes the one or more processors to function as units comprising:
a first acquisition unit configured to acquire peripheral information of a self-vehicle by at least one of a camera, a LIDAR, and a radar;
a second acquisition unit configured to acquire predetermined road information from map information:
a specifying unit configured to specify, based on the peripheral information acquired by the first acquisition unit, a width of a road on which the self-vehicle travels; and
a control unit configured to perform traveling control based on a common region of a width of a road included in the road information acquired by the second acquisition unit and the width of the road specified by the specifying unit.

2. The system according to claim 1, wherein the program, when executed by the one or more processors, further causes the one or more processors to function as units comprising
a second specifying unit configured to specify, based on the peripheral information acquired by the first acquisition unit, a region where another vehicle traveled,
wherein if the width of the road specified by the specifying unit is smaller, the control unit performs traveling control based on the region specified by the second specifying unit in addition to a region of the width.

3. The system according to claim 1, wherein the specifying unit specifies a width of a corresponding road based on a position of a specific feature indicated by the road information acquired by the second acquisition unit and a position of a specific feature indicated by the peripheral information acquired by the first acquisition unit.

4. A traveling control system comprising:
one or more processors; and
a memory storing a program which, when executed by the one or more processors, causes the one or more processors to function as units comprising:
a first acquisition unit configured to acquire peripheral information of a self-vehicle by at least one of a camera, a LIDAR, and a radar;
a second acquisition unit configured to acquire predetermined road information from map information;
a specifying unit configured to specify, based on the peripheral information acquired by the first acquisition unit, a width of a road on which the self-vehicle travels; and
a control unit configured to switch traveling control of the self-vehicle if a difference between a width of a road included in the road information acquired by the second acquisition unit and the width of the road specified by the specifying unit is not smaller than a predetermined threshold.

5. The system according to claim 4, wherein
if the difference is not smaller than a first threshold as the predetermined threshold, and is not larger than a second threshold larger than the first threshold, the control unit performs first traveling control, and
if the difference is larger than the second threshold, the control unit performs second traveling control that imposes a restriction stricter than the first traveling control.

6. The system according to claim 5, wherein each of the first traveling control and the second traveling control includes one of restrictions concerning a degree of change of a level of automated driving, a degree of deceleration, and a lane change.

7. A vehicle control method comprising:
acquiring peripheral information of a self-vehicle by at least one of a camera, a LIDAR, and a radar;
acquiring predetermined road information from map information;
specifying, based on the peripheral information acquired in the acquiring the peripheral information, a width of a road on which the self-vehicle travels; and
performing traveling control based on a common region of a width of a road included in the road information acquired in the acquiring the predetermined road information and the width of the road specified in the specifying.

8. A vehicle control method comprising:
acquiring peripheral information of a self-vehicle by at least one of a camera, a LIDAR, and a radar;
acquiring predetermined road information from a map location;
specifying, based on the peripheral information acquired in the acquiring the peripheral information, a width of a road on which the self-vehicle travels; and
switching traveling control of the self-vehicle if a difference between a width of a road included in the road information acquired in the acquiring the predetermined road information and the width of the road specified in the specifying is not smaller than a predetermined threshold.

* * * * *